(12) United States Patent
Genesereth et al.

(10) Patent No.: US 9,747,633 B2
(45) Date of Patent: Aug. 29, 2017

(54) METHOD AND RELATED APPARATUS FOR GENERATING ONLINE AND PRINTING ON-DEMAND COMPILATION OF WORKS WITH CUSTOMER SELECTABLE PRINTING OPTIONS

(71) Applicants: The Board of Trustees of the Leland Stanford Junior University, Palo Alto, CA (US); KONICA MINOLTA LABORATORY U.S.A., INC., San Mateo, CA (US)

(72) Inventors: Michael Genesereth, Palo Alto, CA (US); Frances Lee, Redwood City, CA (US); Roland Vogl, Palo Alto, CA (US); Toshiro Fujimori, Laguna Beach, CA (US); David Asao, Irvine, CA (US); Daniel Barber, Tustin, CA (US); Philip Wu, Seal Beach, CA (US)

(73) Assignees: THE BOARD OF TRUSTEES OF THE LELAND STANFORD JUNIOR UNIVERSITY, Palo Alto, CA (US); KONICA MINOLTA LABORATORY U.S.A., INC., San Mateo, CA (US)

( * ) Notice: Subject to any disclaimer, the term of this patent is extended or adjusted under 35 U.S.C. 154(b) by 91 days.

(21) Appl. No.: 13/871,977

(22) Filed: Apr. 26, 2013

(65) Prior Publication Data
US 2013/0332315 A1 Dec. 12, 2013

Related U.S. Application Data

(60) Provisional application No. 61/658,380, filed on Jun. 11, 2012.

(51) Int. Cl.
*G06Q 30/00* (2012.01)
*G06Q 30/06* (2012.01)

(52) U.S. Cl.
CPC ........ *G06Q 30/0641* (2013.01); *G06Q 30/06* (2013.01); *G06Q 30/0623* (2013.01)

(58) Field of Classification Search
CPC .................................. G06Q 30/0601–30/0645
(Continued)

(56) References Cited

U.S. PATENT DOCUMENTS

2003/0182210 A1* 9/2003 Weitzman et al. ............. 705/27
2004/0260614 A1* 12/2004 Taratino et al. ................ 705/26
(Continued)

FOREIGN PATENT DOCUMENTS

| JP | 2002-259076 | 9/2002 |
| JP | 2004-133820 | 4/2004 |
| JP | 2010-271772 | 12/2010 |

OTHER PUBLICATIONS

Kodak launch sets out for cd standard. (1993). Electronics Times (Online), 6. Retrieved from https://dialog.proquest.com/professional/professional/docview/672602700?accountid=142257.*
(Continued)

*Primary Examiner* — Resha Desai
(74) *Attorney, Agent, or Firm* — Chen Yoshimura LLP

(57) ABSTRACT

A method and related computer program product for customizing price-related options for printing a compilation of works, including the steps of: compiling the compilation of works; setting different options for customers to print the compilation of works with different prices; and allowing a customer to change one or more of the options to print the compilation of works with a price based on the customer's needs and budget.

2 Claims, 25 Drawing Sheets

(58) Field of Classification Search
USPC .............................................. 705/26.1–27.2
See application file for complete search history.

(56) References Cited

U.S. PATENT DOCUMENTS

| | | |
|---|---|---|
| 2005/0177453 A1* | 8/2005 | Anton et al. ..................... 705/26 |
| 2009/0157711 A1* | 6/2009 | Baer et al. .................... 707/101 |
| 2010/0296122 A1 | 11/2010 | Mitsui |
| 2011/0231322 A1* | 9/2011 | Meyer .......................... 705/310 |
| 2012/0221436 A1* | 8/2012 | Patterson et al. .......... 705/26.41 |

OTHER PUBLICATIONS

Japanese Office Action, dated Mar. 1, 2016, in a counterpart Japanese patent application, No. JP 2013-122594.

* cited by examiner

FIG. 12

METHOD AND RELATED APPARATUS FOR GENERATING ONLINE AND PRINTING ON-DEMAND COMPILATION OF WORKS WITH CUSTOMER SELECTABLE PRINTING OPTIONS

BACKGROUND OF THE INVENTION

Field of the Invention

This invention generally relates to a method and related apparatus for generating online and printing on-demand compilation of works, and in particular, it relates to managing contents and assembling articles into booklets which can be printed on-demand with customer selectable printing options.

Description of Related Art

The rapid development of new printing and telecommunication technologies has made it possible to generate and provide customized compilation of works in printed or other electronic forms on a print-on-demand (POD) basis, which generally refers to production of commercial-quality finished products in printed or electronic forms such as books and compilation booklets on a relatively small scale, typically by a professional print shop, at the request of customers.

One example of generating and producing compilations of works may be that in many educational institutions, a teacher or professor often needs to assemble a group of works and compile them into a volume of course materials. Another example may be that in a business entity or an organization, an instructor or trainer needs to assemble a group of works and compile them into a booklet of training materials. Such works may include previously published papers or articles, images and graphics etc. which may be available in hard copies traditionally but now increasingly in electronic (digital) formats, such as in the portable document (PDF) format. These works may include PDF files in the teacher or instructor's own collection, e.g., stored in his or her own computer storage device such as a hard disc drive, or in a file folder assigned to him or her on a server of the institution or organization. These works may also include PDF files in other third parties' collections, e.g., stored in the third parties' servers and may be accessed via a computer network such as the Internet by using uniform resource locator (URL) links.

Once the teacher or instructor selects the PDF files, they can be assembled together to generate a compilation of works. After a compilation of works is generated into a volume or booklet of articles, students or organization members may purchase the volume or booklet by placing POD orders with a print shop that can print and deliver the volumes or booklets to the students or members.

Often times a compilation of work may be printed with different options that would affect the price of the compilation of works. For example a course booklet may be printed with different types of paper, binding, etc. where higher grade paper or more perfect binding will cost more to print the booklet but lower grade paper or simpler binding will cost less. Customers who desire to have a high quality hard copy of the course booklet may be willing to pay for a higher price, whereas customers who desire to save on the printing price may be willing to accept a standard quality hardcopy of the course booklet.

There is a need to provide a more efficient and cost-effective method and related apparatus for online generation and purchase of compilations of works on a POD basis with customer selectable printing options that are associated with different prices.

SUMMARY

The present invention is directed to a method and related apparatus for generating and printing compilations of works, which provides a more efficient and economical online platform for easily managing contents and assembling articles into booklets that can be readily ordered and printed on-demand with customer selectable printing options that are associated with different prices.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for customizing price-related options for printing a compilation of works, including the steps of: compiling the compilation of works; setting different options for customers to print the compilation of works with different prices; and allowing a customer to change one or more of the options to print the compilation of works with a price based on the customer's needs and budget.

In another aspect, one exemplary embodiment of the present invention further provides a computer program product that causes a data processing apparatus to perform the above methods. The computer program product includes a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 4-13 illustrate screen shots from executing various steps of the exemplary process for online management of contents and generation of booklets as shown in FIG. 3.

DETAILED DESCRIPTION OF PREFERRED EMBODIMENTS

Embodiments of the present invention provide a more efficient and cost-effective method and related apparatus for online management, generation and purchase of compilations of works on a print-on-demand (POD) basis with customer selectable printing options that are associated with different prices.

As an example of practical scenarios of the need for managing, generating and printing compilations of works, a teacher or professor in an educational institution may need to assemble educational materials for the students to order and purchase. As another example of practical scenarios of such need, an instructor or trainer of a business entity or organization may need to assemble training materials for the members to order and purchase.

Figure 1:
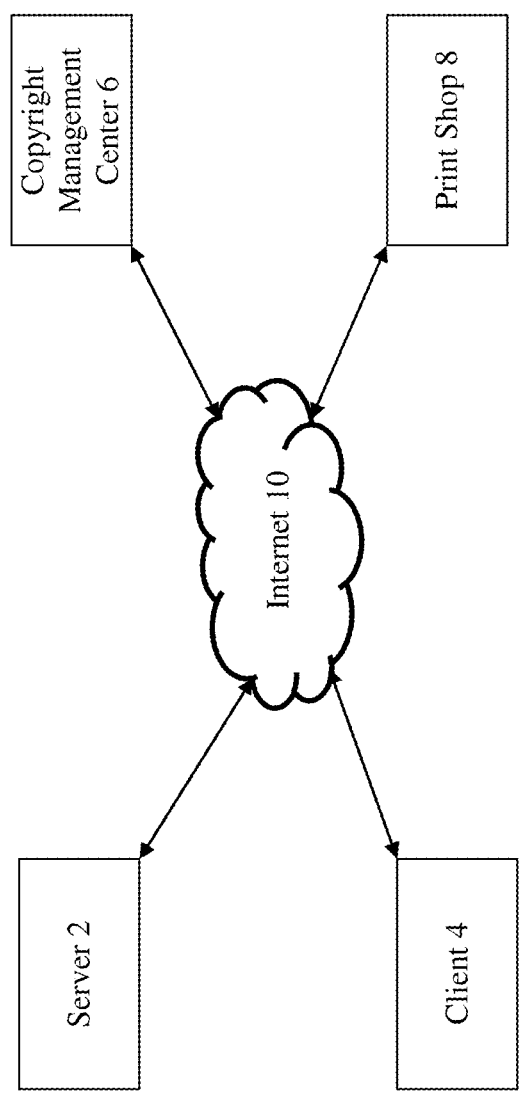
FIG. 1 schematically illustrates an exemplary online environment in which embodiments of the present invention may be implemented.

Referring to FIG. 1, there is schematically illustrated an exemplary online environment in which embodiments of the present invention may be implemented. The exemplary online environment includes a server 2, a client computer 4, one or more copyright management center servers 6, and a print shop server 8, connected via one or more computer network 10 such as the Internet or other communication links. A client (such as a teacher or a trainer, or a student or a member of an organization) uses the client computer 4 to interact with the server 2. The server 2 executes a computer program stored in a memory to perform processes according to the embodiments of the present invention. The copyright management center servers 6 stores digital contents and associated copyright data or license information that may be obtained for use by the clients. The print shop may be a professional print shop equipped with printers and various other image reproduction machines for producing printed products such as books, booklets, etc. The print shop server 8 manages the print jobs submitted to the print shop by the clients or customers.

The server 2 generally provides an integrated service that allows a client to search and acquire contents from content sources, to compile them into an electronic file and submit the compiled file to a POD service to produce a printed product, and to order and purchase the printed product of the compiled works. The clients may access the server 2 from their own computers 4 via the network 10 once they establish their user accounts on the server 2. The server 2 may interact with the copyright management center server 6 for searching and obtaining contents of the works to be compiled. The server 2 may also interact with the print shop server 8 for printing and delivering the compiled works in hard copy or electronic forms.

In this application, the term "copyright management center" generally refers to a place or service that facilitates the management and distribution of copyrighted materials and the obtaining and transferring of payment to copyright holders. Typically, a copyright management center facilitates legitimate access to copyrighted content by providing a copyright registry, where users can locate copyright information about a work, by also providing a copyright marketplace exchange, where users can buy and sell copyrights, and by further providing a copyright clearance service that can connect with third party distribution platforms. Examples of such copyright management centers may include digital repository of published work maintained by some publishers or digital libraries maintained by various organizations. Another example of copyright management center is the Copyright Clearance Center.

Therefore, "copyright management center 6" of the online environment shown in FIG. 1 may include any types of sources of digital contents and their copyright data and license information. More generally, "copyright management center 6" of the online environment shown in FIG. 1 may also include any third party content sources such as databases or depositories where hard or electronic copies of articles, publications or other contents and works may be stored or otherwise kept.

The physical locations or the commercial relationship among the various components of the online environment shown in FIG. 1 are not important. For example, the server 2 may be operated by the copyright management center, or the print shop, or a separate institution, organization or commercial establishment.

Also in this application the term "client" generally refers to a customer or anyone who uses the method or related apparatus provided by the embodiments of the present invention. For example it may refer to a teacher or student in an educational institute, or an instructor or a member in an organization. Specifically for the process described in this application, "client" may refer to "booklet compiler" and "booklet reader", where "booklet compiler" (or "compiler") refers to anyone who manages the contents or articles, and generates compilation of works from the contents or articles, and "booklet reader" (or "reader") refers to anyone who orders the printing or purchases the finished product of the compilation of works that have already been generated. For example, a compiler may be a teacher in an educational institute or an instructor of an organization, whereas a reader may be a student in the educational institute or a member of the organization.

Both the compilers and the readers may have access accounts at the server 2 and share some common rights or features on the server 2, but some of their other rights may be different. For example, a compiler may have right to generate a booklet from compilation of works, whereas a reader may not have such right but may have right to order prints of the booklet. These details will become more apparent and clear in the description below.

As mentioned earlier, in one aspect the present invention is embodied a computer program product that causes a data processing apparatus to perform the methods of the present invention. The computer program product includes a computer usable non-transitory medium (e.g. memory or storage device) having a computer readable program code embedded therein for controlling a data processing apparatus, where the computer readable program code is configured to cause the data processing apparatus to execute the method of the present invention. The computer readable program code includes many functional modules and the essential ones that are closely related to the steps of the process described below are exemplarily shown in FIG. 2.

Figure 2:
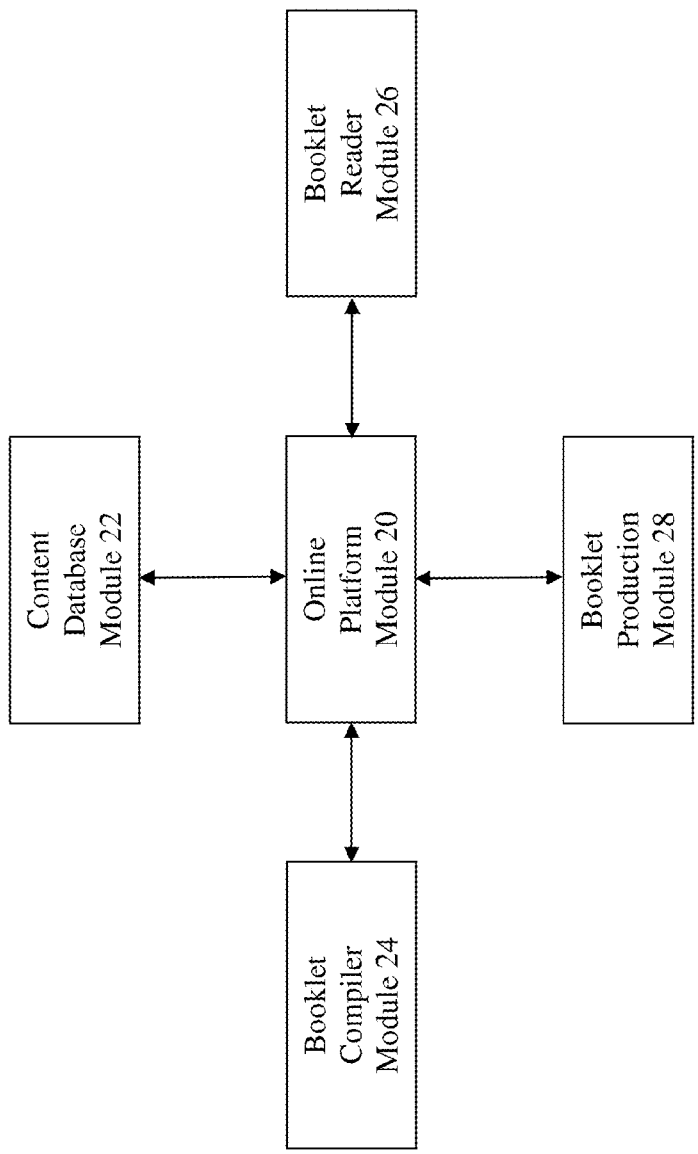
FIG. 2 schematically illustrates an exemplary computer program architecture in which embodiments of the present invention may be implemented.

Referring to FIG. 2, there is schematically shown an exemplary computer program architecture in which embodiments of the present invention may be implemented. The computer program architecture shown in FIG. 2 includes functional modules that are essential and closely related to the steps of the process according to the present invention.

More specifically, there is shown an online platform module 20 that controls and executes the operations at the server 2 (and/or the print shop server 8) shown in FIG. 1 for providing an online platform to implement the relevant steps of the present invention process, including but not limited to, providing a user interface (UI) to the clients, providing clients account and access management on the server 2, providing folder structure and data storage management to the clients on the server 2, and providing online ordering and payment capacities on the server 2, etc.

There is also shown in FIG. 2 a booklet compiler module 24 that controls and executes the operations at the customer's computer 4 or server 2 (and/or the server at copyright management center 6) shown in FIG. 1 for providing access to server 2 by a compiler, managing the compiler's account information at the server 2, managing the file folders assigned to the compiler, creating and editing booklets, ordering booklets and paying online, etc.

There is further shown in FIG. 2 a booklet reader module 26 that controls and executes the operations at the customer's computer 4 or server 2 (and/or the server at copyright management center 6) shown in FIG. 1 for providing access to server 2 by a reader, managing the reader's account information at the server 2, browsing and searching for booklets, ordering booklets and paying online, etc.

In addition, there is shown in FIG. 2 a booklet production module 28 that controls and executes the operations at the server 2 (and/or the server at print shop 8) shown in FIG. 1 for processing print orders made at the online platform 20, processing payment for purchases of booklets, making print job orders, transmitting electronic files of the booklets to the print shop server 8, and handling production, assembly and delivery of booklets, etc.

It is understood that the exemplary computer program architecture in which embodiments of the present invention may be implemented may include other functional modules not shown in FIG. 2 that facilitates the execution of the steps of the process in accordance with the method of the present invention.

Figure 3:
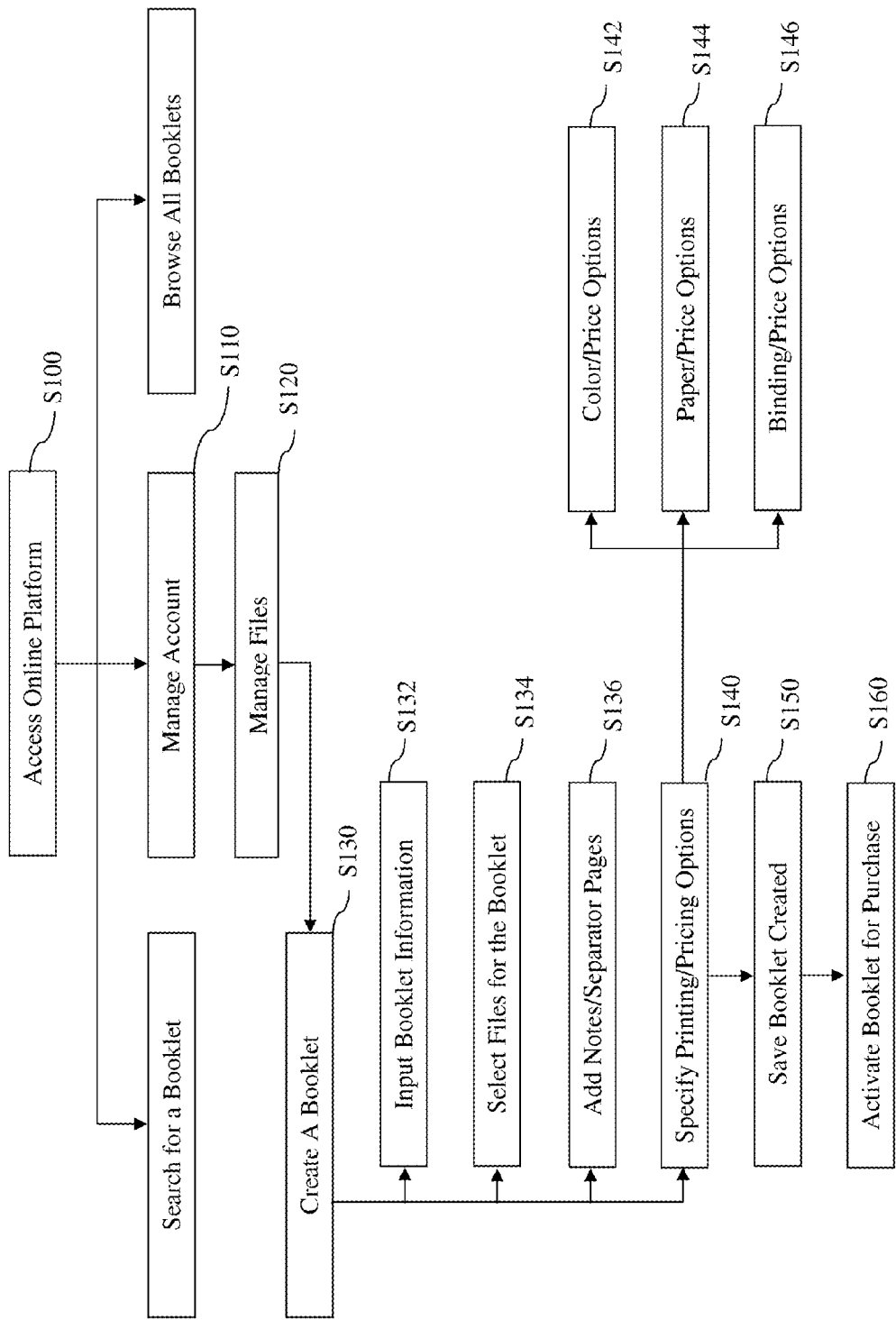
FIG. 3 schematically illustrates an exemplary process for online management of contents and generation of booklets as parts of a computer-implemented method for generating and printing compilations of works in accordance with an embodiment of the present invention.

Referring to FIG. 3, there is shown a schematic illustration of an exemplary process for online management of contents and generation of booklets as parts of a computer-implemented method for generating and printing compilations of works in accordance with an embodiment of the present invention. Generally the steps shown in FIG. 3 reflect the steps that a compiler will take to manage the files and create booklets on the server that provides the online platform, e.g., server 2 shown in FIG. 1. Of course anyone who has the access to the server and authority to manage file folders assigned to him or her on the server can take these steps to manage his or her files on the server, not necessarily a complier.

As Step S100 shown in FIG. 3, the compiler may access the online platform by, e.g., access the web-site of the online platform. The compiler typically needs to provide a valid username and a matching password to log in.

Figure 4:

Referring to FIG. 4, there is shown a screen shot of an exemplary user interface (UI) display of the home page of the online platform web-site, in this example an online bookstore, after the compiler logs into the web-site. From this home page the compiler may search for a booklet by clicking on "Search Now" at the lower left portion of the screen, access his or her account by clicking on, e.g., "My Account" at either the top menu bar or the lower middle portion of the screen, or browse all booklets by clicking on, e.g., "Browse" at either the top menu bar or the lower right portion of the screen.

At Step S110 shown in FIG. 3, the compiler may access his or her account by clicking on, e.g., "My Account" at either the top menu bar or the lower middle portion of the screen shown in FIG. 4. This will take the compiler to the "Account Overview" page as shown in FIG. 5.

Figure 5:
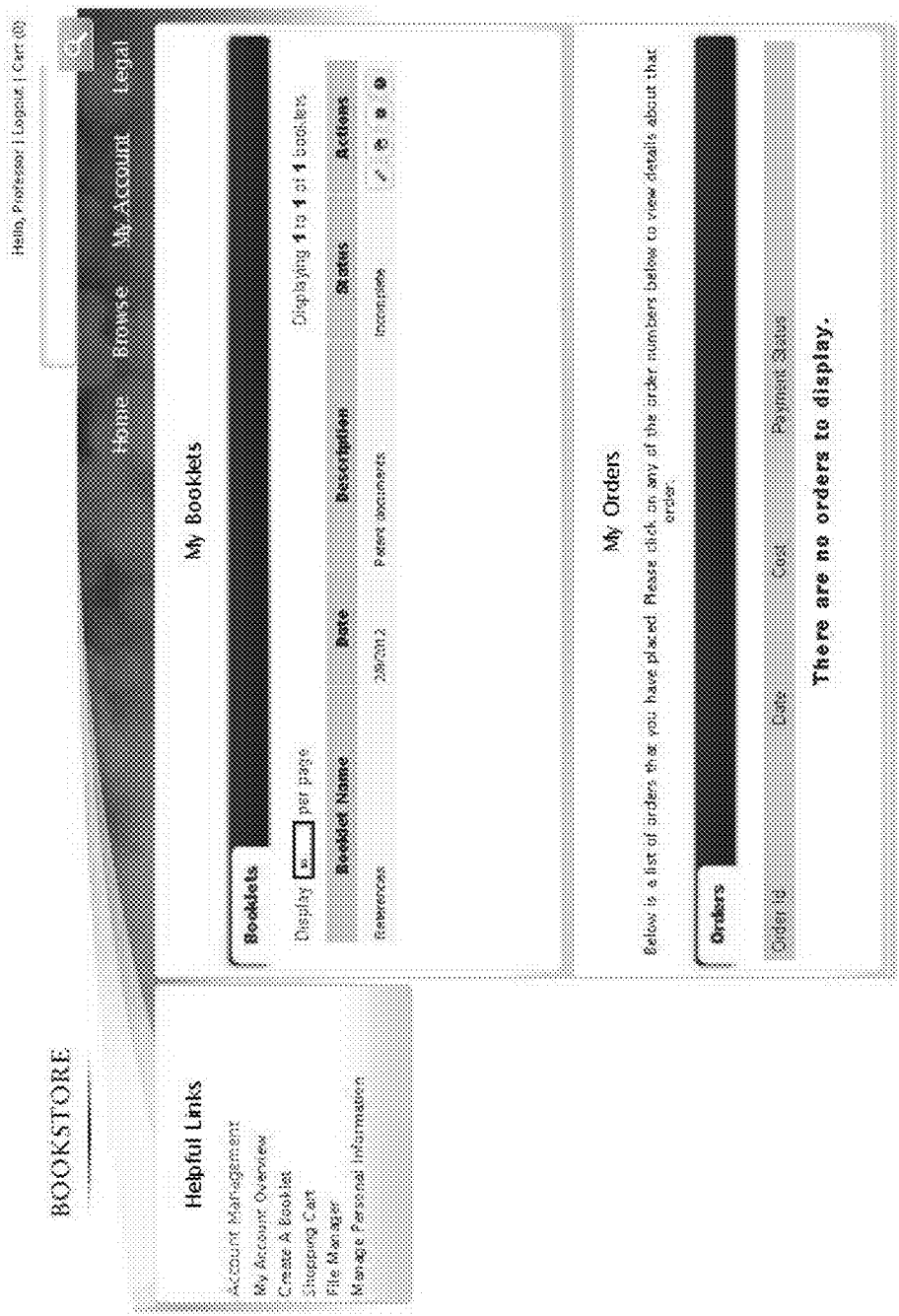

Referring to FIG. 5, there is shown a screen shot of an exemplary UI display of the "Account Overview" page of the online platform web-site. On this page the compiler may see a list of the booklets that have been generated or are in progress, and also the status of all orders placed by the compiler. On the booklet list, each booklet is listed with its name, date of creation, its brief description, and its status. For example, a booklet in progress may be listed as "incomplete" (in progress), "ready" (generated but not activated for ordering), or "active" (activated for ordering). Under the "actions" menu heading at the end of the book list, there are icons for actions that may be taken on each of the booklet. For example, the action icons may include an icon for editing the booklet information, an icon for editing the booklet files, an icon for editing print options, and an icon for activating/deactivating the booklet.

On the left portion of the "Account Overview" page shown in FIG. 5, the compiler may click on the "File Manager" link to manage his or her files, or click on the "Create A Booklet" link to generate a booklet. The compiler may also click on the "Manage Personal Information" link to edit his or her personal information, or click on the "Shopping Cart" link to check out the items he or she intends to order.

At Step S120 shown in FIG. 3, the compiler can performs file management tasks by clicking on the "File Manager" link as shown in FIG. 5. The main tasks that the compiler may perform for managing his or her files includes activating or deactivating files, setting and changing file types, sharing file with others, rejecting or accepting and managing files shared by others, uploading or retrieving or searching files, create excerpts as new file, and so on.

A compiler's well managed file folder is in a sense like a small personal "library" of the compiler. The library contains articles with metadata that may be used to retrieve correct intellectual property (IP) rights such as copyrights. Some of the articles in the library may already have associate IP rights, e.g., the articles retrieved from a copyright management center database such as the copyright database. Some of the articles on the library may not have IP right yet, e.g., the articles uploaded by the compiler. However, all necessary IP rights will be obtained by the online platform before the articles are used, e.g., printed in a booklet ordered and purchased by the readers. The files in the library are not necessarily purchased yet so they may not be downloaded or otherwise distributed, but the compiler can preview them in order to create booklets, and the IP rights of the booklets will be paid for later when the booklets are purchased.

Some of the articles in the library may have pricing information as well. The price of an article may be based on a number of factors, e.g. the number of pages, membership or affiliation of the compiler and/or the readers, etc. The metadata and other information of the articles may be sent to the copyright management center for calculating the price of the articles.

Referring back to FIG. 3, another important task that a compiler may perform at online platform is the generation of booklets, which is also a part of a computer-implemented method for generating and printing compilations of works in accordance with an embodiment of the present invention. At Step 130 the compiler may create a new booklet by clicking on the "Create A Booklet" link at the left portion of the page shown in FIG. 5 or any other page where such a link is provided, which will link to the "Create A Booklet" page as shown in FIG. 6.

Figure 6:
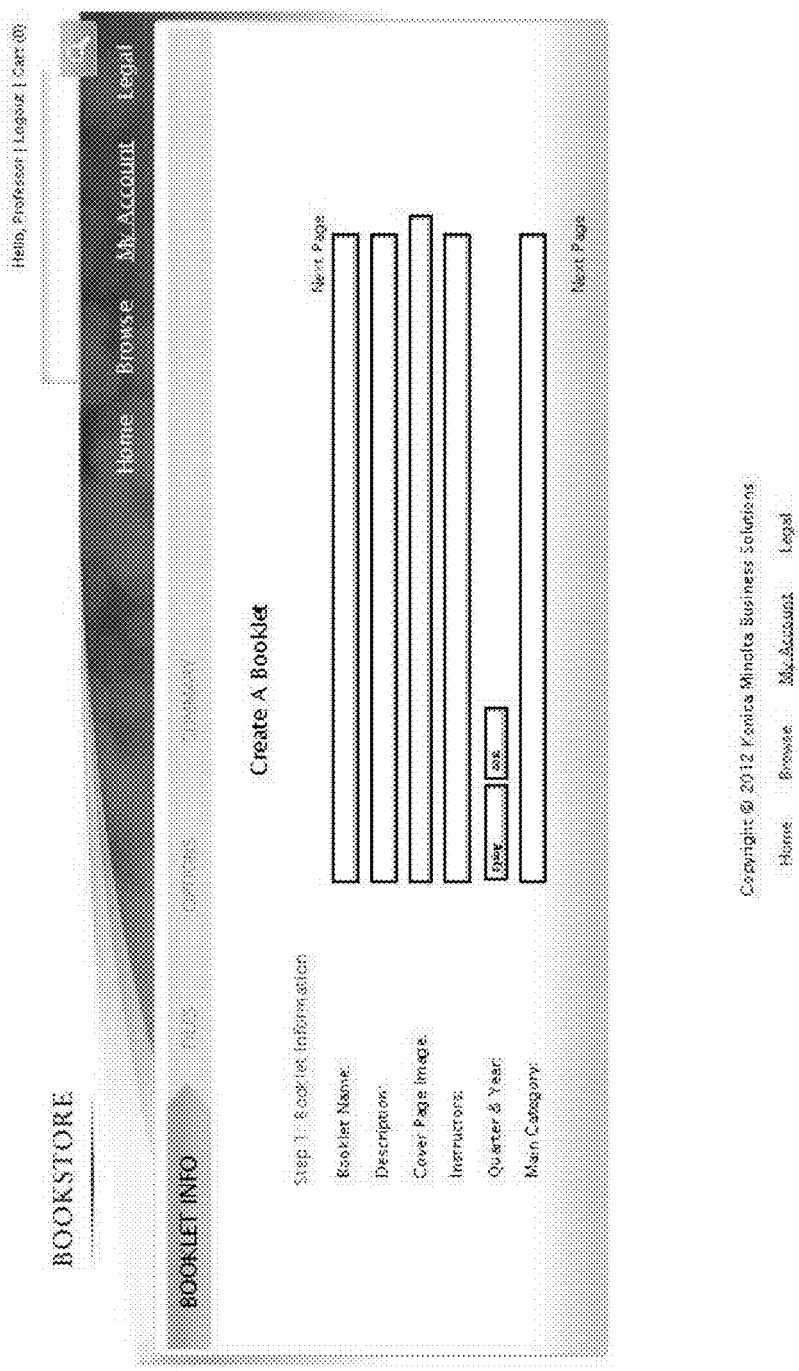

Referring to FIG. 6, there is shown a screen shot of an exemplary UI display of the "Create A Booklet" page of the online platform web-site. At Step 132 shown in FIG. 3 the compiler enters booklet information. The UI shown in FIG. 6 provides text boxes for the compiler to input the name and description of the booklet. An image may also be uploaded from the compiler's local computer, e.g., the client computer 4 shown in FIG. 1, to the online platform provider's server e.g. server 2 shown in FIG. 1. In this example the booklet is created for an educational institution, so the compiler may also enter the course instructor's name, the quarter and school year during which the booklet will be used, and the main category of the booklet.

Figure 7:
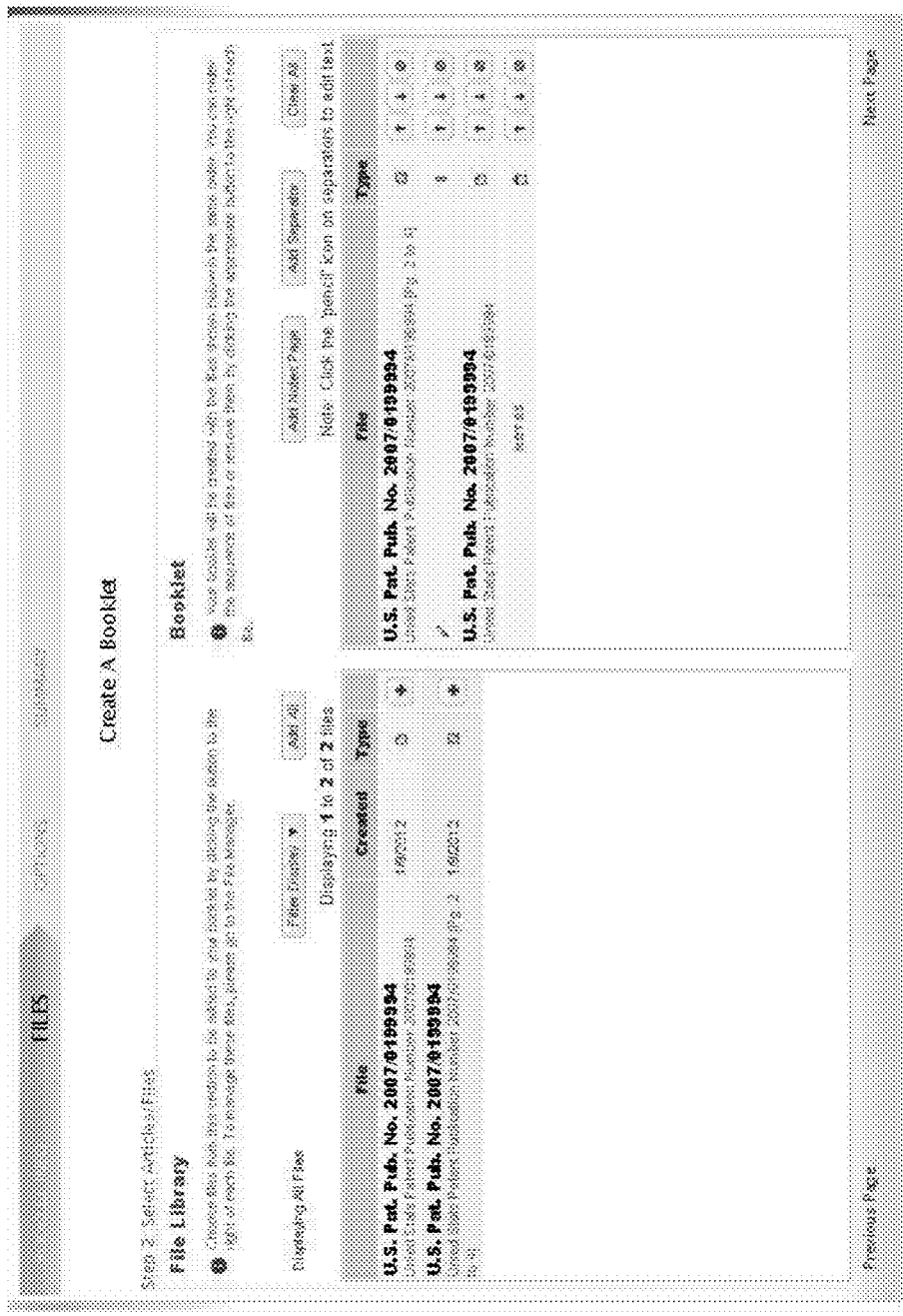

Referring to FIG. 7, there is shown the next page of the "Create A Booklet" UI for the compiler at Step 134 shown in FIG. 3 to select articles or files to be included in the booklet. As shown in FIG. 7, active articles that may be used in the booklet are displayed on the left side portion of the page. A filter may be applied to the file display to focus on certain labeled files by clicking on the "Filter Display", upon which used file labels are displayed so they can be selected to be used to filter the files. For example if the label "Top Priority" is selected for the filter, then only files labeled as "Top Priority" will be displayed in the file list.

The file type of each article is displayed by a small icon under the "Type" heading. This provides a quick reference to the compiler as to the type of each file listed. By clicking on the small plus sign icon at the end of file name and next to the file type icon, a file can be added to the booklet. Alternatively, clicking on the "Add All" button will add all files listed to the booklet. Files that are added to the booklet are displayed at the right side portion of the page.

In addition to the content files added to the booklet, the compiler at Step 136 shown in FIG. 3 may add notes pages to the booklet by clicking on the "Add Notes Page" button, and may also add separator pages to the booklet by clicking on the "Add Separator" button. Notes pages are blank pages for the readers to write their notes on, and separator pages are pages used for separating various parts, sections or chapters of the booklet.

For all files added into the booklet, including the notes and separator pages, their respective file types are displayed by the small file type icons under the "Type" heading. This provides a quick reference to the compiler as the type of each file, e.g., a normal article, a cover image, a table of contents (TOC), a non-paginated excerpt, a notes page, a separator page, etc. This will help the compiler to quickly determine the appropriate location of the files in the booklet, which may be adjusted by clicking on the moving up or moving down icons at the end of the file name. For example, a cover page may be placed at the beginning of the booklet, while a notes page may be placed at the end of the booklet.

Figure 18:
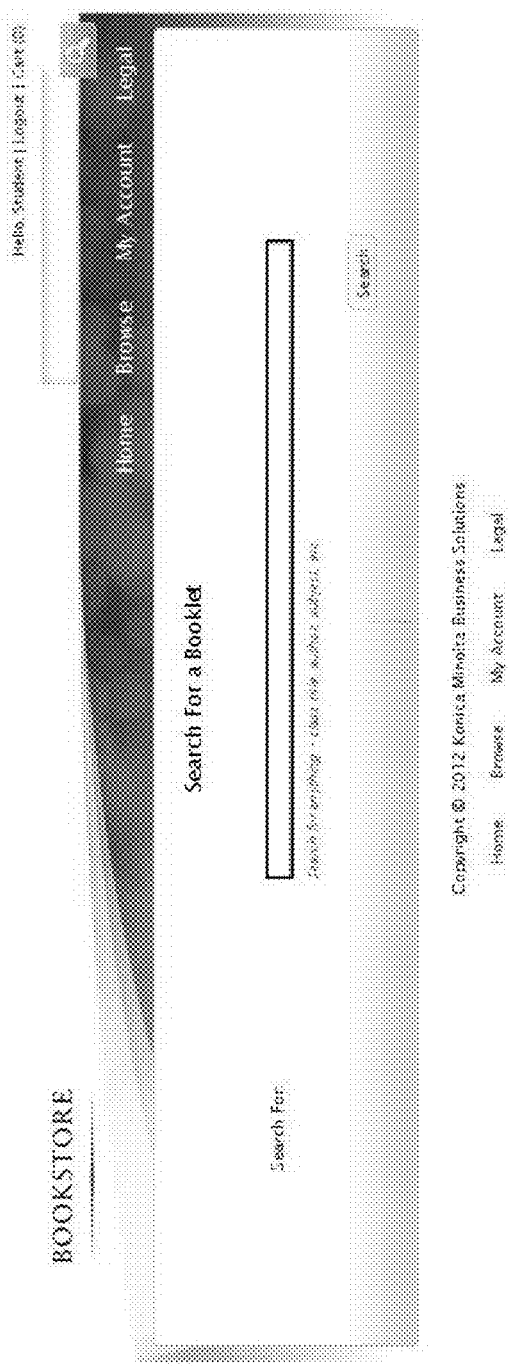

A file that needs to be removed from the booklet may be removed by clicking on a small icon among the group of icons at the end of each file name. Alternatively all files in a booklet may be removed by clicking on the "Clear All" button as seen in FIG. 18. Page navigation buttons, e.g., "Previous Page" and "Next Page", are provided so that the compiler may navigate among the various pages in the booklet creation process.

After the files of the booklet are selected, the compiler may at Step S140 shown in FIG. 3 specify the options for printing the booklet. The UI provided to the compiler at the online platform web-site are designed to make this a smooth process, as seen in FIGS. 8-10.

Figure 8:
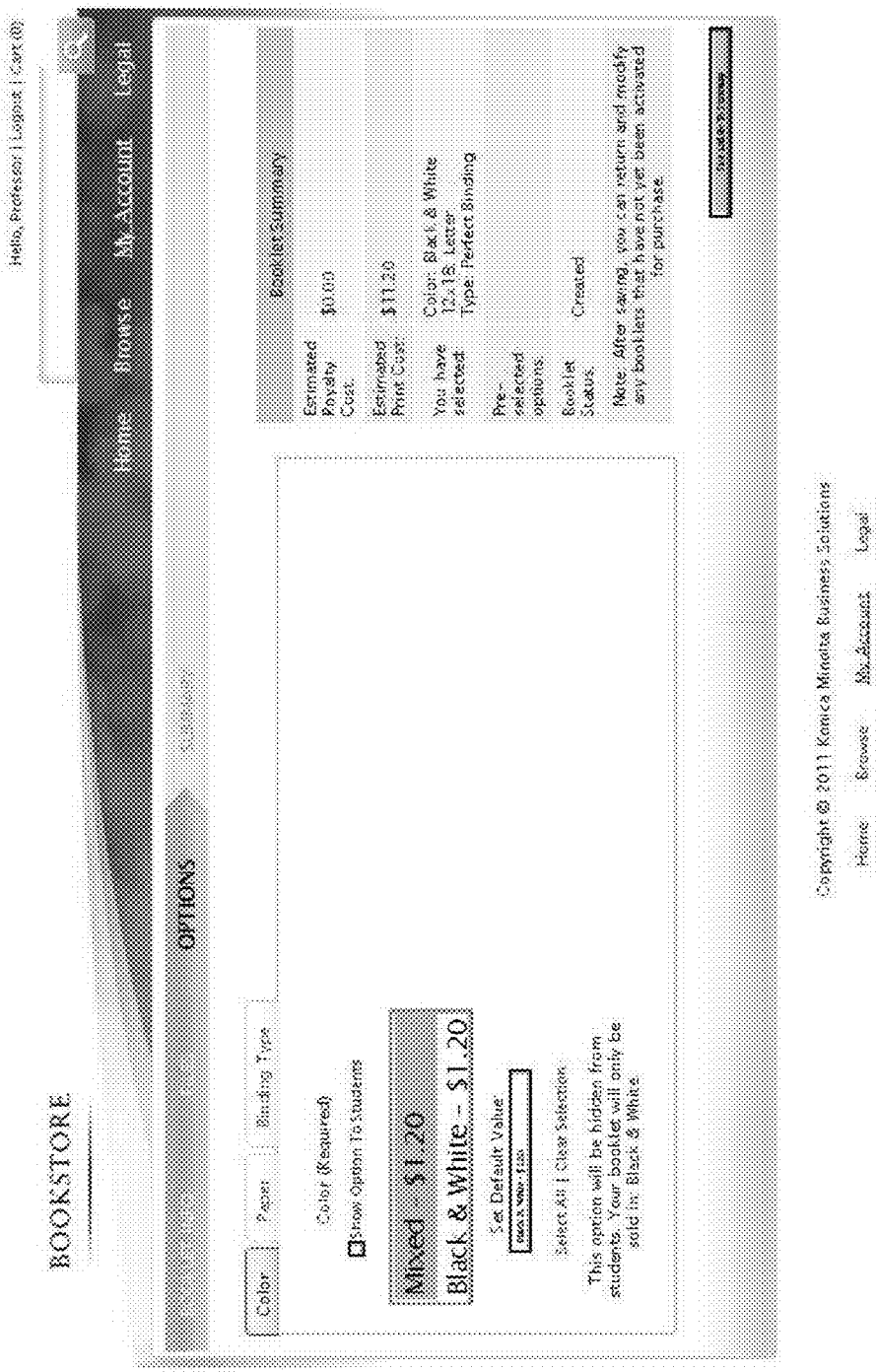

Referring to FIG. 8, there is shown a screen shot of an exemplary UI display of the "Options" page of the online platform web-site. From this page the compiler may set various printing options, e.g., color, paper, binding type, etc., by clicking on the "Color", "Paper", "Binding Type" buttons respectively. These are Steps 142, 144 and 146 shown in FIG. 3. Of course other steps may also be included to specify the print/price options.

As each print option is specified, pricing information for the option is displayed. Some of the printing options may be required and therefore may not be changed by the readers when the readers later order the booklet. Therefore the compiler may elect not show some of the options to the readers by leaving the small box in front of "Show Option" unchecked. On FIG. 8 there is shown the color options that may be set by the compiler. The small window on the left portion of the page displays the color options and their respective pricing information. A booklet summary is displayed on the right portion of the page which is updated in real-time as soon as an option is changed by the compiler.

Figure 9:
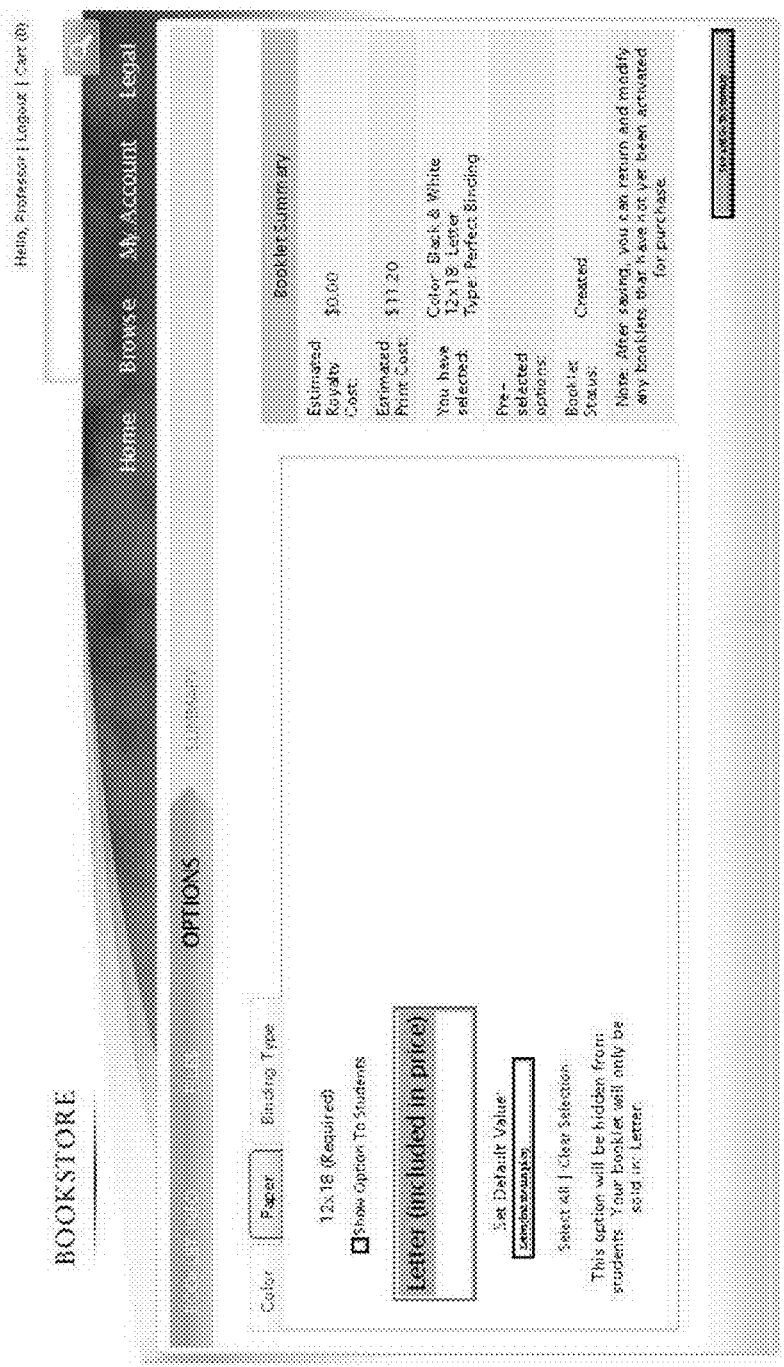
Figure 10:
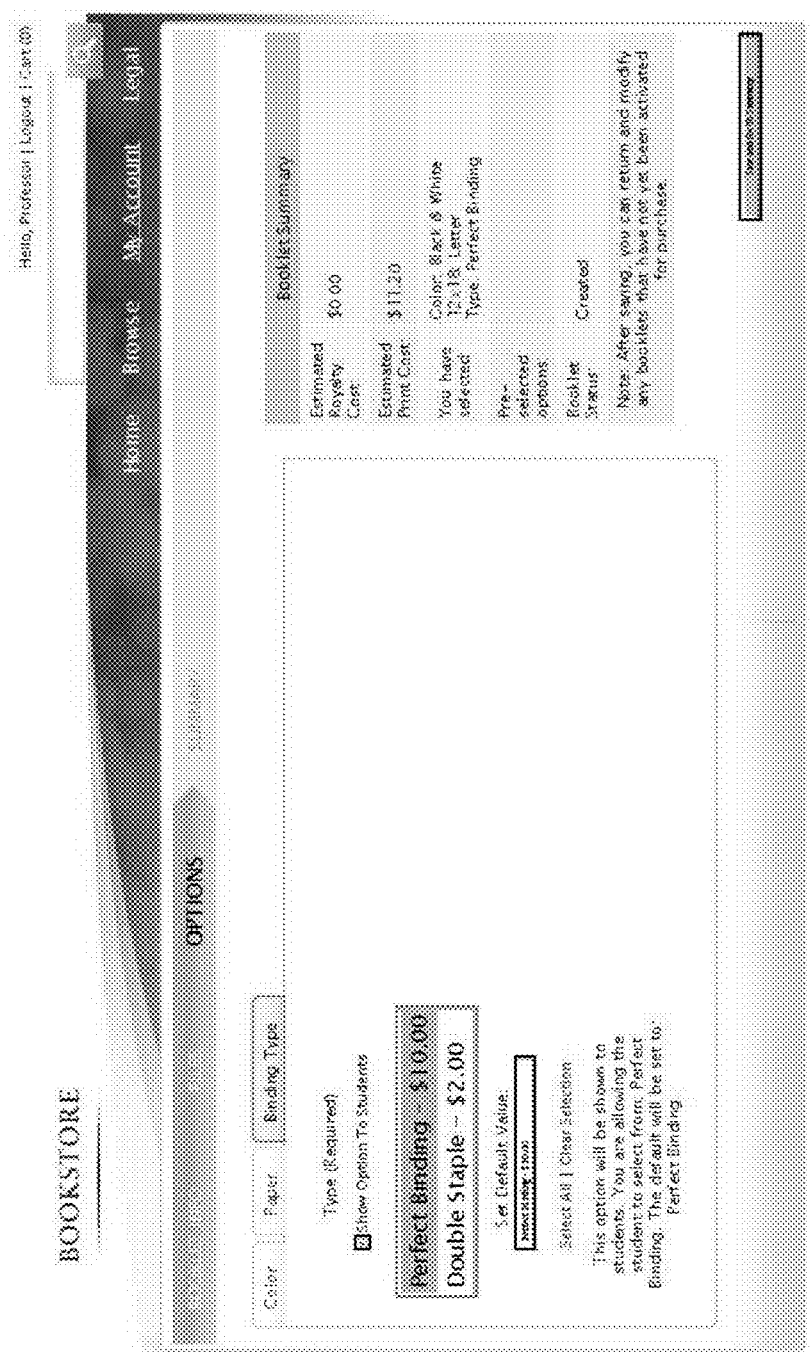

Referring to FIG. 9, there is shown the paper options that may be set by the compiler. The small window on the left portion of the page displays the paper options and their respective pricing information.

Referring to FIG. 10, there is shown the binding type options that may be set by the compiler. The small window on the left portion of the page displays the binding type options and their respective pricing information. In this example the readers are allowed to select different binding types so the small box in front of "Show Option" is checked. This will allow a reader to select different binding types at the time when the reader is ordering the booklet. For example the reader may select the "Double Staple" binding type which cost only $2.00 per booklet versus the "Perfect Binding" binding type which costs $10.00 per booklet in order to save some money.

As seen from these steps, the compiler can determine whether a particular one of the different options to print the compilation of work may or may not be changed by the readers, and depending on such determination the particular option may or may not be viewed by the readers. In other words, if it is determined that an option may be changed by customers, then the readers will be allowed to view the option, but if it is determined that an option may not be changed by customers, then the readers may not be allowed to view the option. The compiler can change the status of a particular option from being allowed to be changed by customers to not being allowed to be changed by customers, or vice versa.

Once all options are set the compiler at Step S152 shown in FIG. 3 may click on the "Save and Go To Summary" button at the lower right corner of the page shown in the Options page (e.g., FIGS. 8-10). This will bring up the "Summary" page as shown in FIG. 11.

Figure 11:
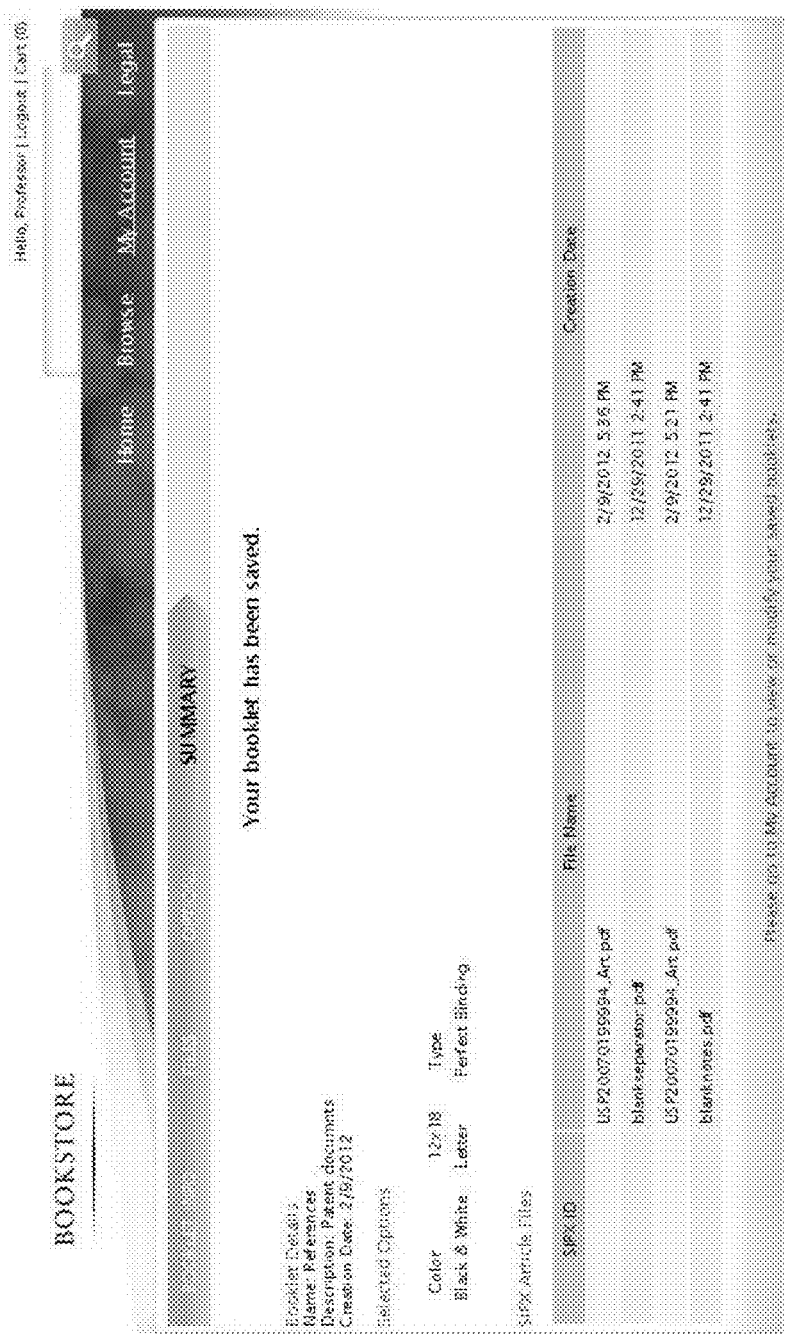

Referring to FIG. 11, there is shown a screen shot of an exemplary UI display of the booklet creation "Summary" page of the online platform web-site. Details of the booklet, including the name, description, creation date, printing options, files included in the booklet, etc., are all displayed for quick and easy reference. This provides an overview of the booklet created and saved, and helps the compiler to see whether it is created as planned.

Figure 12:
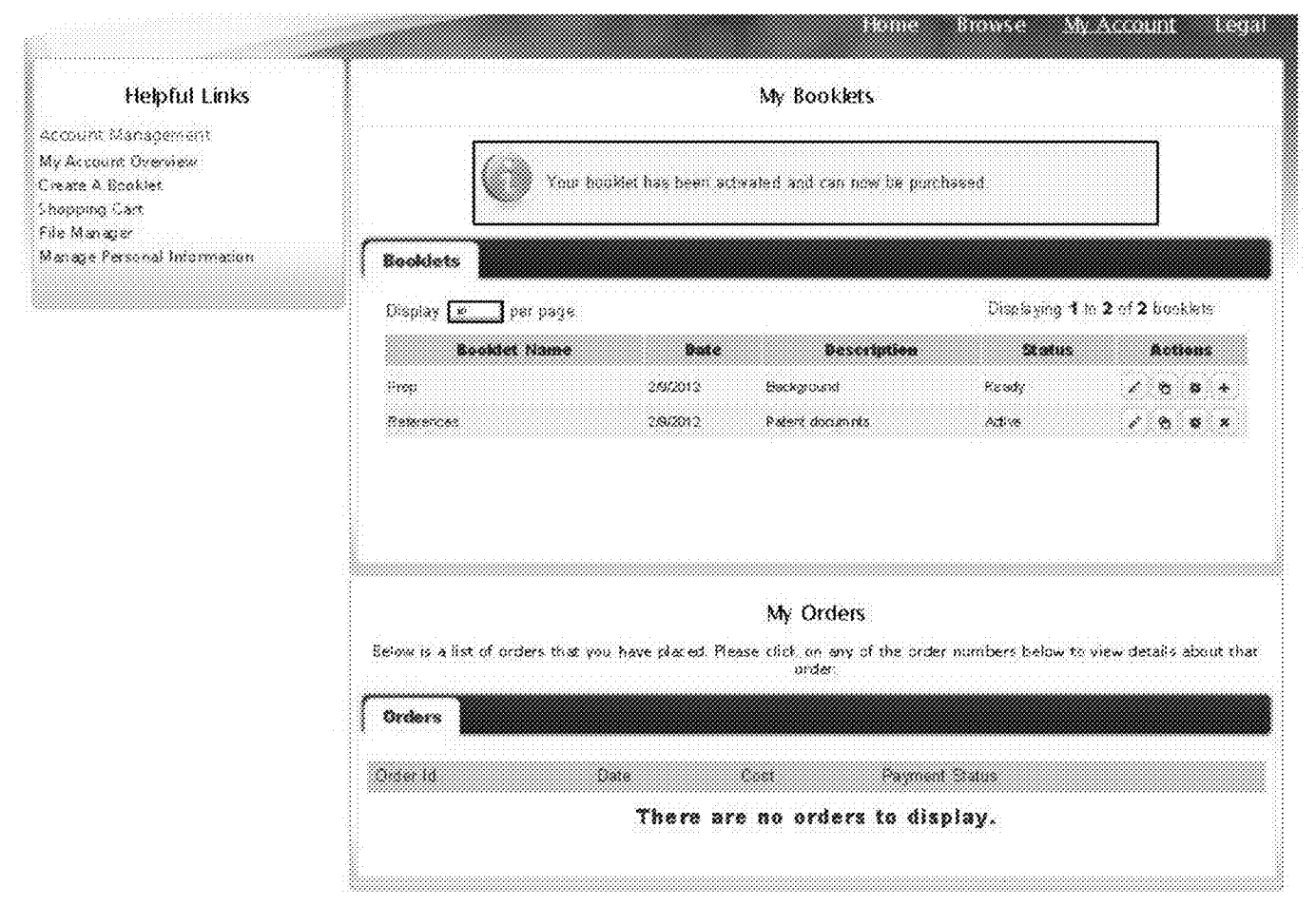

Referring to FIG. 12, there is shown a screen shot of an exemplary UI display of the "My Account Overview" page of the online platform web-site, showing the booklet that has just been created and saved. The compiler at Step S154 shown in FIG. 3 may activate a booklet for later purchase by clicking on the small plus sign icon at the end of the booklet name under the "Actions" heading. A text message will be briefly displayed to confirm the activation of a booklet made available for purchase. If the compiler for whatever reason decides not to make the booklet available for purchase, the compiler may deactivate a booklet by clicking on the small cross sign icon at the end of the booklet name under the "Actions" heading. Consequently an active booklet will have a small cross sign icon at the end of its name under the "Actions" heading, whereas an inactive booklet will have a small plus sign icon at the end of its name under the "Actions" heading, as shown in FIG. 12.

Figure 13:
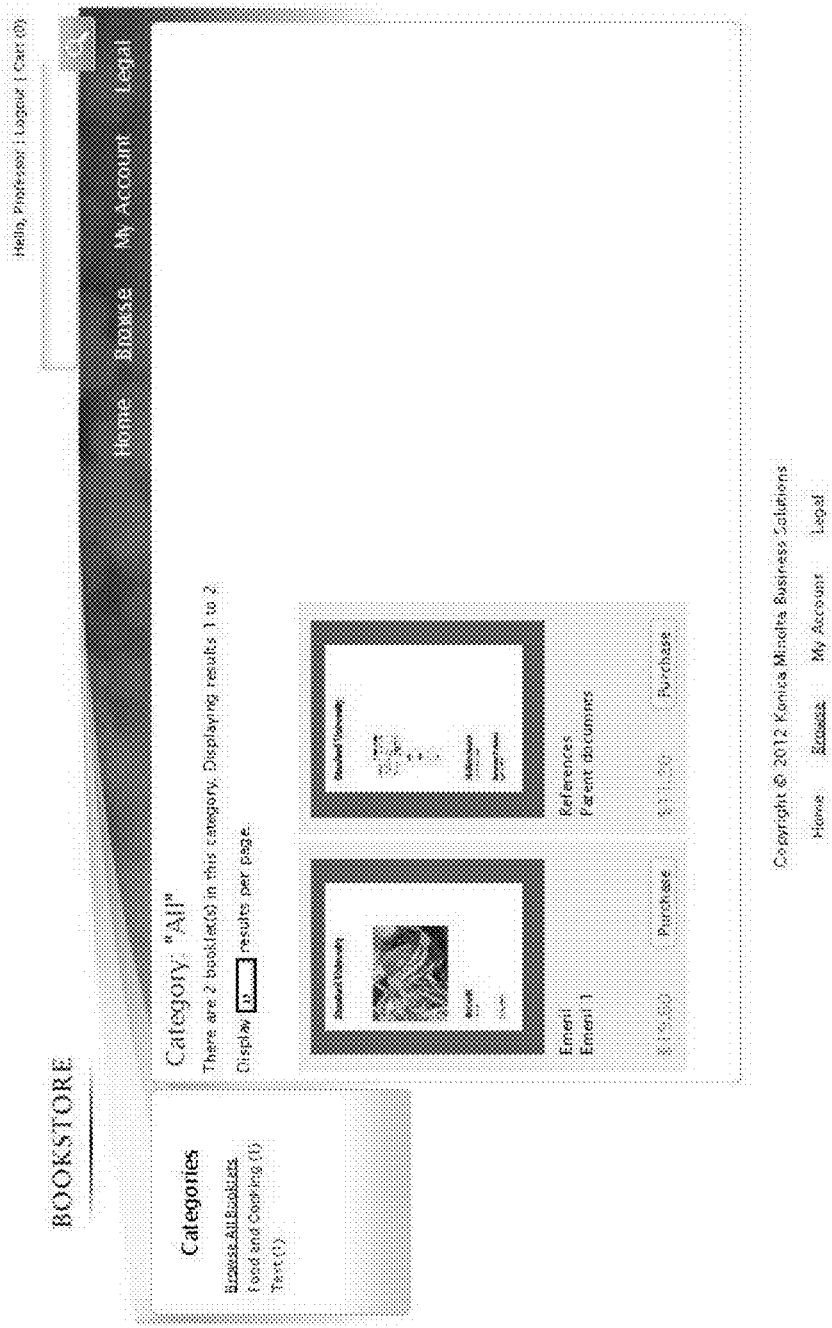

Referring to FIG. 13, by clicking on the "Browse" button on the web-pages, all active booklets will be displayed. Booklets may be assigned to different categories, and by clicking on the link of a particular category at the left portion of the page, only booklets of the selected category will be displayed. From here any displayed booklet may be purchased by clicking on the "Purchase" button under the thumbnail image of the booklet cover. The steps of purchasing a booklet will be described in detail below.

When printing options are selected, the compiler can see price difference and the price for the readers, for different options such as color, paper, binding type, etc. The compiler can see the end result (i.e., price to the readers) of his or her choices of the printing options, so the compiler can be sensitive to the readers' cost.

Figure 14:
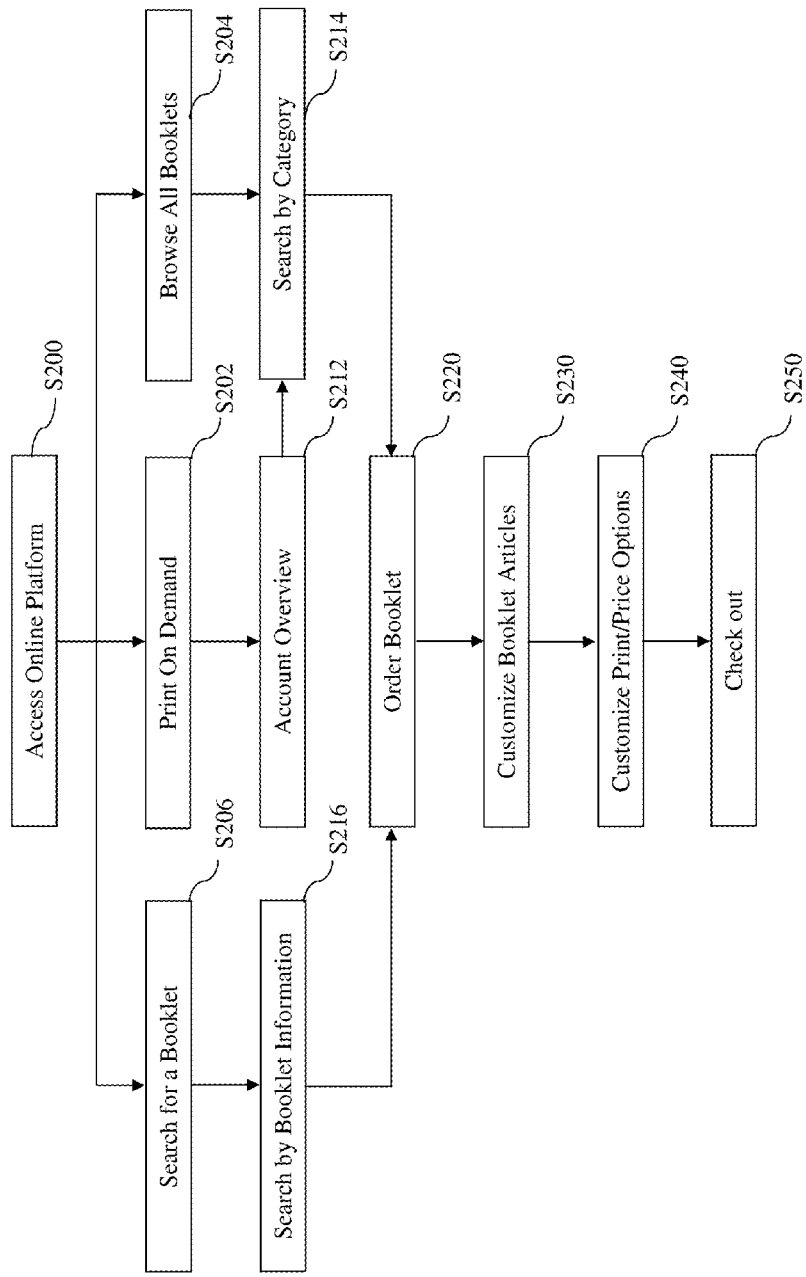
FIG. 14 schematically illustrates an exemplary process for online ordering and purchasing on-demand of booklets as a part of a computer-implemented method for generating and printing compilations of works in accordance with an embodiment of the present invention.

Referring to FIG. 14, there is shown a schematic illustration of an exemplary process for online searching and purchasing of booklets as parts of a computer-implemented method for generating and printing compilations of works in accordance with an embodiment of the present invention. Generally the steps shown in FIG. 14 reflect the steps that a reader will take to find and order a booklet on the server that provides the online platform, e.g., server 2 shown in FIG. 1. Of course anyone who has the access to the server and authority to search for and purchase activated booklets on the server can take these steps to search and purchase booklets on the server, not necessarily a reader. For example a compiler will essentially go through the same process to order and purchase a print copy of a booklet and the UI pages for the compiler are basically the same as the ones that will be described below.

At Step S200 shown in FIG. 14, the reader accesses the online platform by, e.g., access the web-site of the online platform. The reader also needs to provide a valid username and a matching password to log in. Once logged in, the reader will see the same home page as shown in FIG. 4, from which the reader may search for a booklet by clicking on "Search Now" button at the lower left portion of the screen, or browse all available booklets by clicking on the "Browse" button at either the top menu bar or the lower right portion of the screen, or access his or her account by clicking on, e.g., "My Account" button at either the top menu bar or the lower middle portion of the screen.

Figure 15:
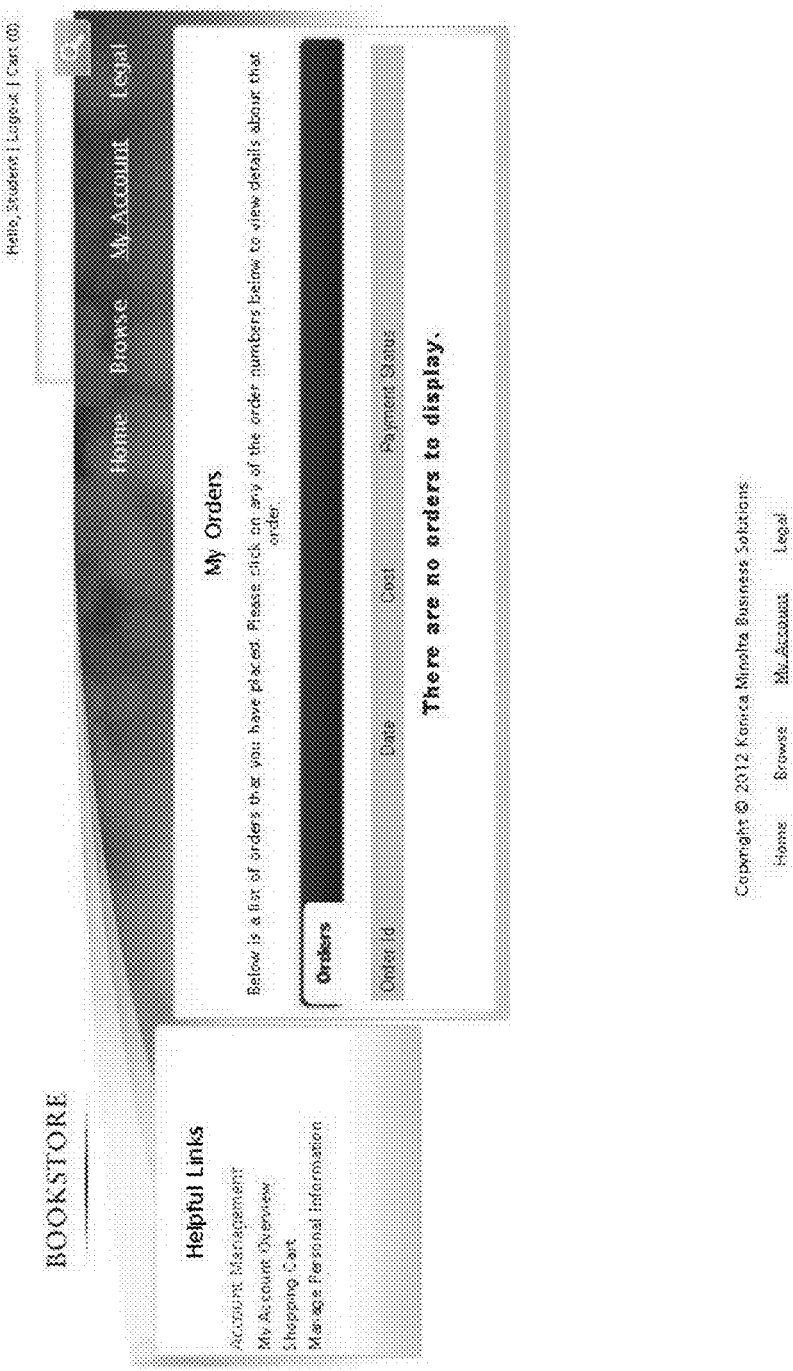
FIGS. 15-25 illustrate screen shots from executing various steps of the exemplary process for online ordering and purchasing on-demand of booklets as shown in FIG. 14.

When the reader proceeds at Step 202 shown in FIG. 14 to access his or her account by clicking on, e.g., "My Account" button at either the top menu bar or the lower middle portion of the screen, the account overview page will be displayed as shown in FIG. 15.

Referring to FIG. 15, there is shown a screen shot of an exemplary UI display of a reader's "Account Overview" page of the online platform web-site. On this page the reader may see a list of the booklets that have been ordered by the reader and the status of all orders placed by the compiler. From this page the reader at Step S212 shown in FIG. 14 may click on the "Browse" button to browse all activated booklets that are available for purchase, which has the same effect as clicking on the "Browse All Booklets" button at the lower right portion of the screen shown in FIG. 4.

Figure 16:
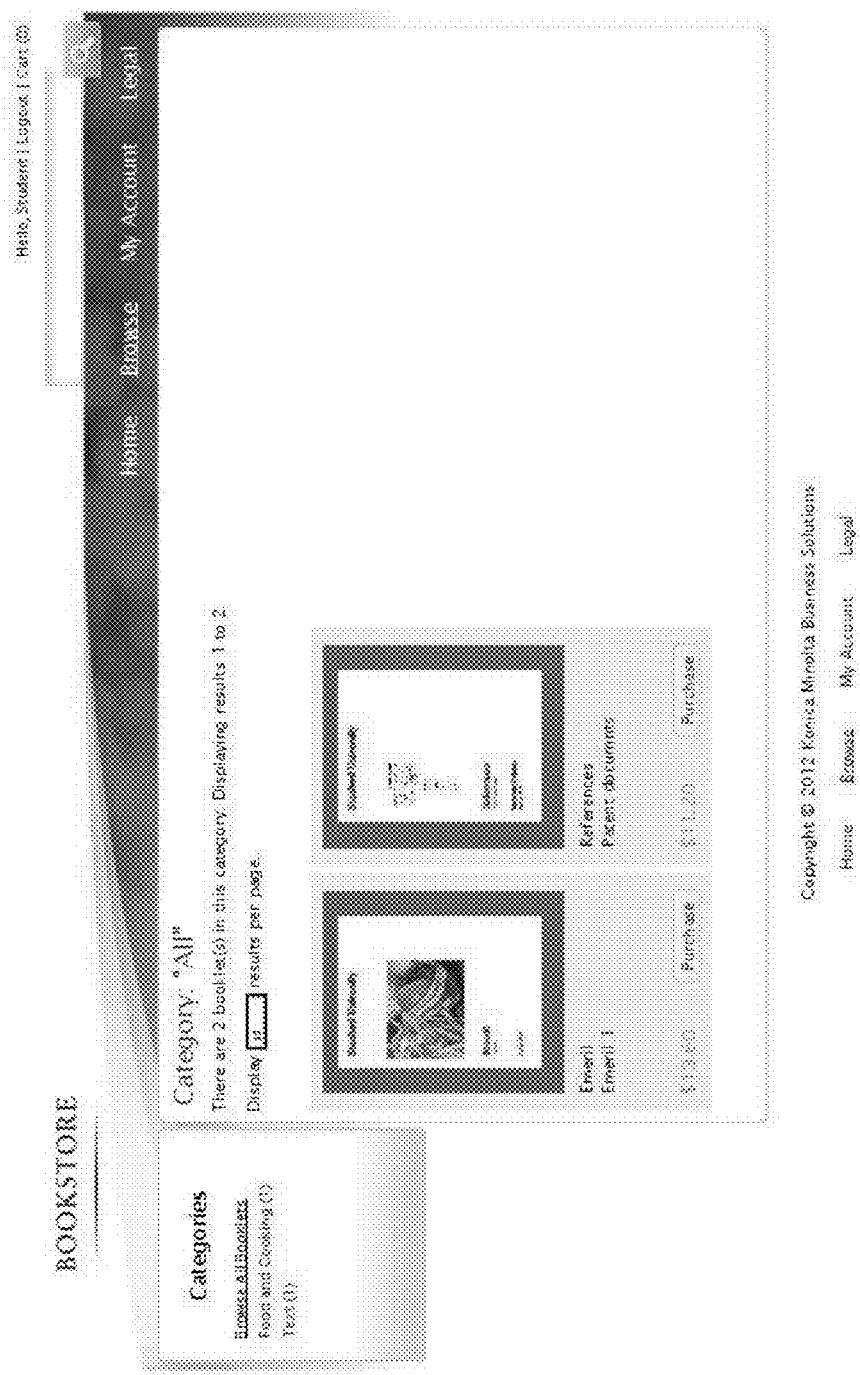

When the reader proceeds at Step 204 shown in FIG. 14 to browse all booklets either by clicking on the "Browse" button at the top menu bar or the "Browse All Booklets" button at the lower right portion of the page shown in FIG. 4, or by clicking on the "Browse" button at the top menu bar from the "Account Overview" page shown in FIG. 15, all booklets that are available for purchase are searched for and displayed in a page as shown in FIG. 16.

Referring to FIG. 16, all search result for available booklets are displayed. This page is the same as the page shown in FIG. 13, where booklets of all categories are displayed. Again, booklets may be displayed according to their categories. At the Step S214 as shown in FIG. 14, a reader may search booklets of a particular category by clicking on the link of the category at the left portion of the page shown in FIG. 16, so that only the booklets of the selected category will be searched for and displayed. For example by clicking on the "Text" category link at the left portion of the page, only the booklet(s) belong to the "Text" category will be displayed, as shown in FIG. 17.

Figure 17:

Referring to FIG. 17, there is shown the browse result for the selected category, e.g. "Text". In the example shown in FIG. 17, the booklet "Reference—Patent Documents" is in this category and therefore displayed.

When the reader proceeds at Step 206 shown in FIG. 14 to search for a particular booklet by clicking on the "Search Now" button at the lower left portion of the home page as shown in FIG. 4, a search page is displayed as shown in FIG. 18. This allows a reader at Step 216 shown in FIG. 14 to search for a booklet.

Referring to FIG. 18, on the search screen a text box is provided to the reader. The reader may type in any search criteria or key words, such as title, author, subject, etc. of a booklet, and the search will return all booklets that match the search criteria, as shown in FIG. 19.

Figure 19:
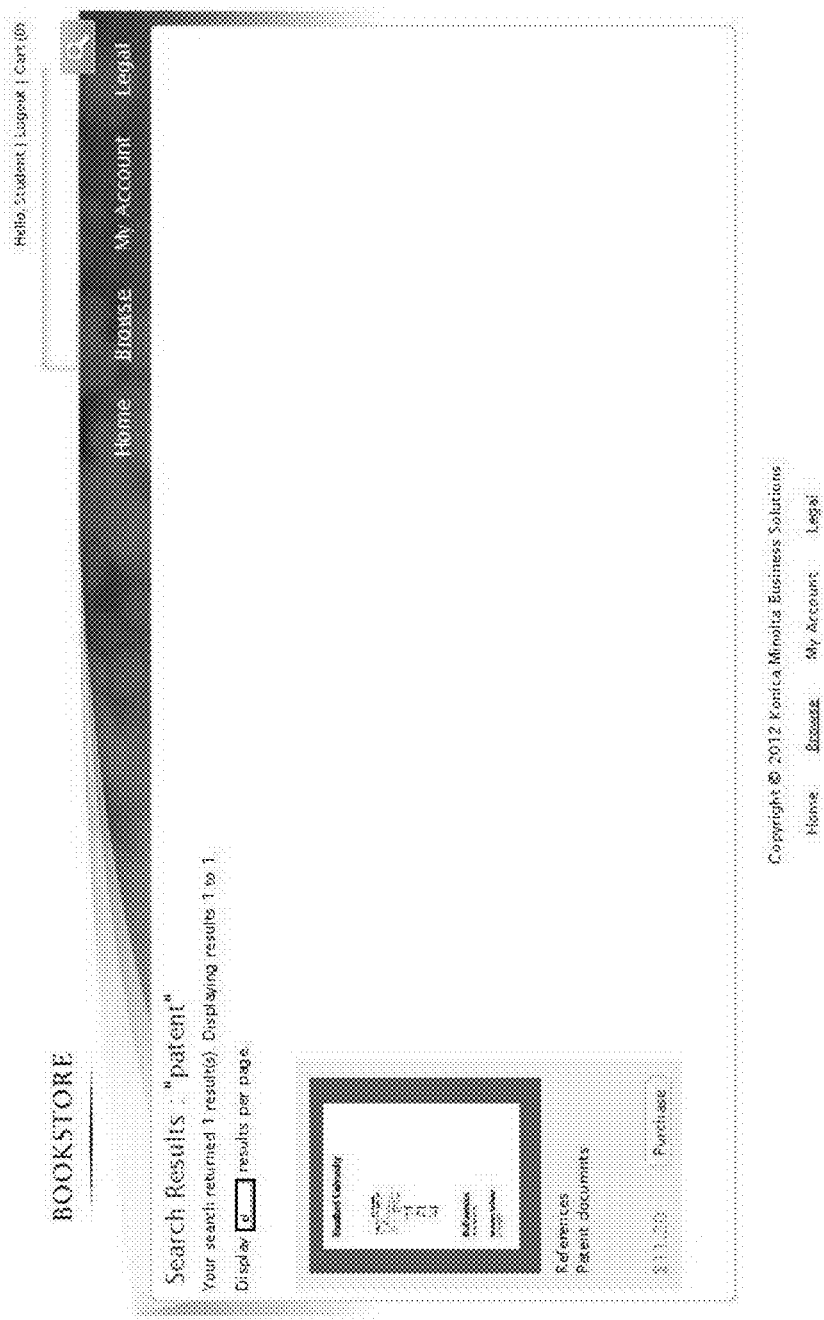

Referring to FIG. 19, there is shown the search result. In the example the booklet "Reference—Patent Documents" is found to match the search criteria and therefore displayed. The UI of this page is the same as the one shown in FIG. 17. Both pages show a booklet is found for purchase by the reader. At Step S220 the reader may purchase the booklet by clicking on the "Purchase" button shown under the thumbnail image of the booklet cover as shown in FIG. 17 and FIG. 19, which leads to the next page shown in FIG. 20.

Figure 20:
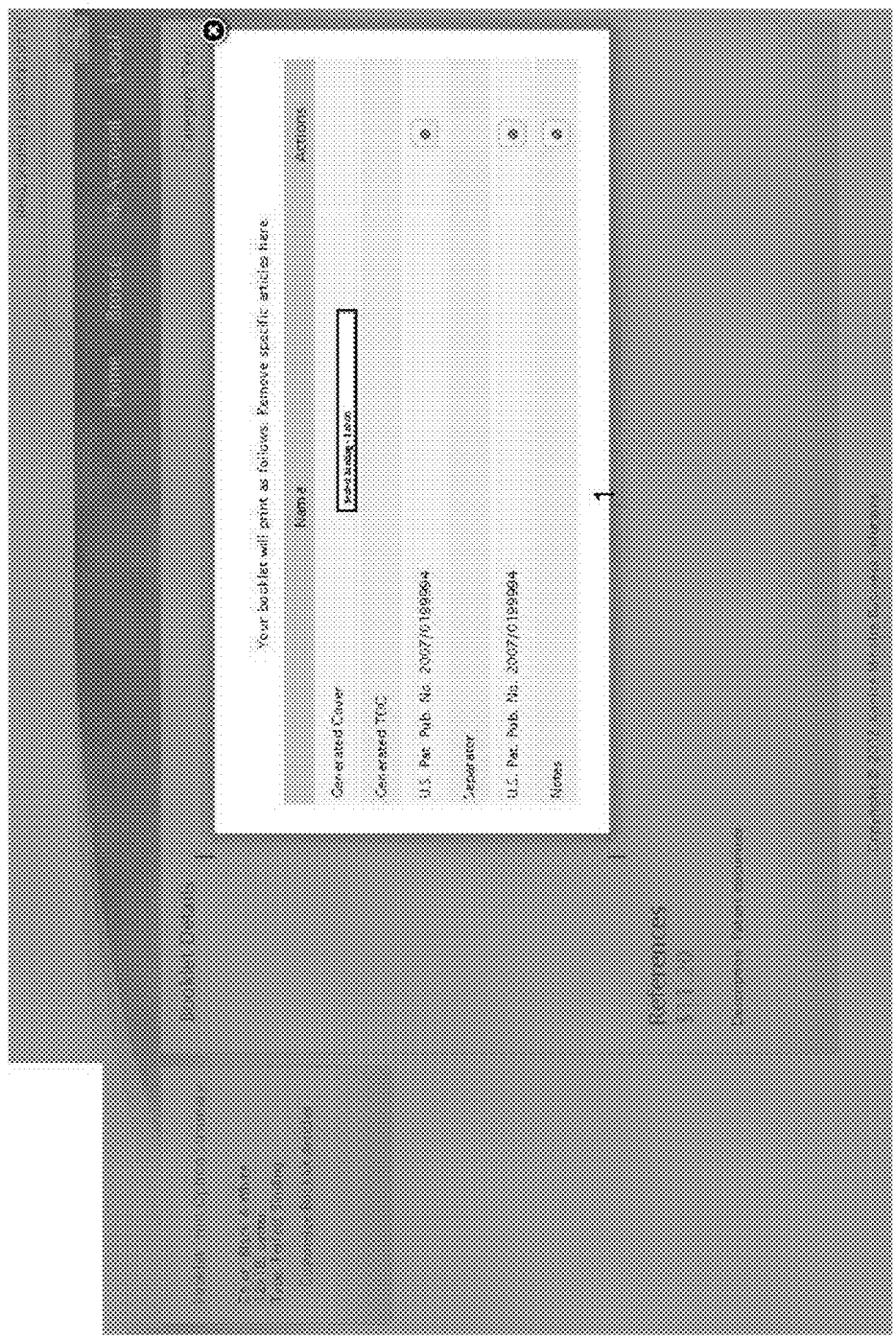

Referring to FIG. 20, there is shown a screen shot of an exemplary UI display of a reader's "Review" page of the online platform web-site. On this page the reader may see the booklet print option summary displayed at the left portion of the page. The images of the pages of the booklet is displayed in the main window at the center portion of the page under the "Booklet Details" heading, where the image of each page of the booklet can be reviewed, one page at a time, with scroll bars underneath the image for navigating through the pages. At the right portion of the page, printing options that are allowed to be displayed to the reader are displayed, and the reader is offered an opportunity to customize the booklet articles and booklet print options.

At Step 230 as shown in FIG. 14 the reader may customize the inclusion of articles of the booklet by clicking on the "Customize Booklet Articles" link at the left portion of the page under the booklet print option summary as shown in FIG. 20.

Referring to FIG. 20, a list of the articles and other pages in the booklet is displayed. At the end of each file name and under the "Actions" heading there are provided small action icons. The reader may click on one of the small icons at the end of a file name to perform an action on that file. For example, the icons shown in FIG. 20 are for removal of articles. Often times the reader may already have a previously obtained copy of a particular article included in the booklet. By clicking on the small removal icon at the end of the file name of a listed article, that article can be removed from the booklet, which may result in saving the printing cost to the reader. After one or more articles are removed, the page numbers for the other articles may remain the same. It is noted that certain types of article or pages may not be allowed to be removed, e.g., the table of contents.

Furthermore, at Step 240 as shown in FIG. 14 the reader may customize the print/price option of the booklet. Referring back to FIG. 20, when a print setting is allowed to be shown to the reader, the options of that print setting will be displayed in the right portion of the page. These options are the ones the compiler set in the previously described steps S140-146 shown in FIG. 3. For example, the print/price options may include color, paper and binding options with their respective prices. However, only the ones that the compiler allows to change may be shown to the reader.

In the example shown in FIG. 20 the print/price that is allowed to be shown to the reader is "Binding Type", so the options of binding type and its price are shown in the right portion of the page. When the options of binding type are allowed to be changed by the reader, a drop down menu may be displayed and from which the reader may select his or her desired option. For example, under the "Binding Type" display, the drop down menu may include the options of "Perfect Binding: $10.00" and "Double Staple: $2.00". If a reader desires to have a higher quality copy of the booklet and does not mind the higher price, then he or she may select the "perfect binding" option of the binding type. On the other hand, if a reader is more price conscious and does not mind to have a stapled booklet, then he or she may select the "double staple" option of the binding type.

Figure 21:
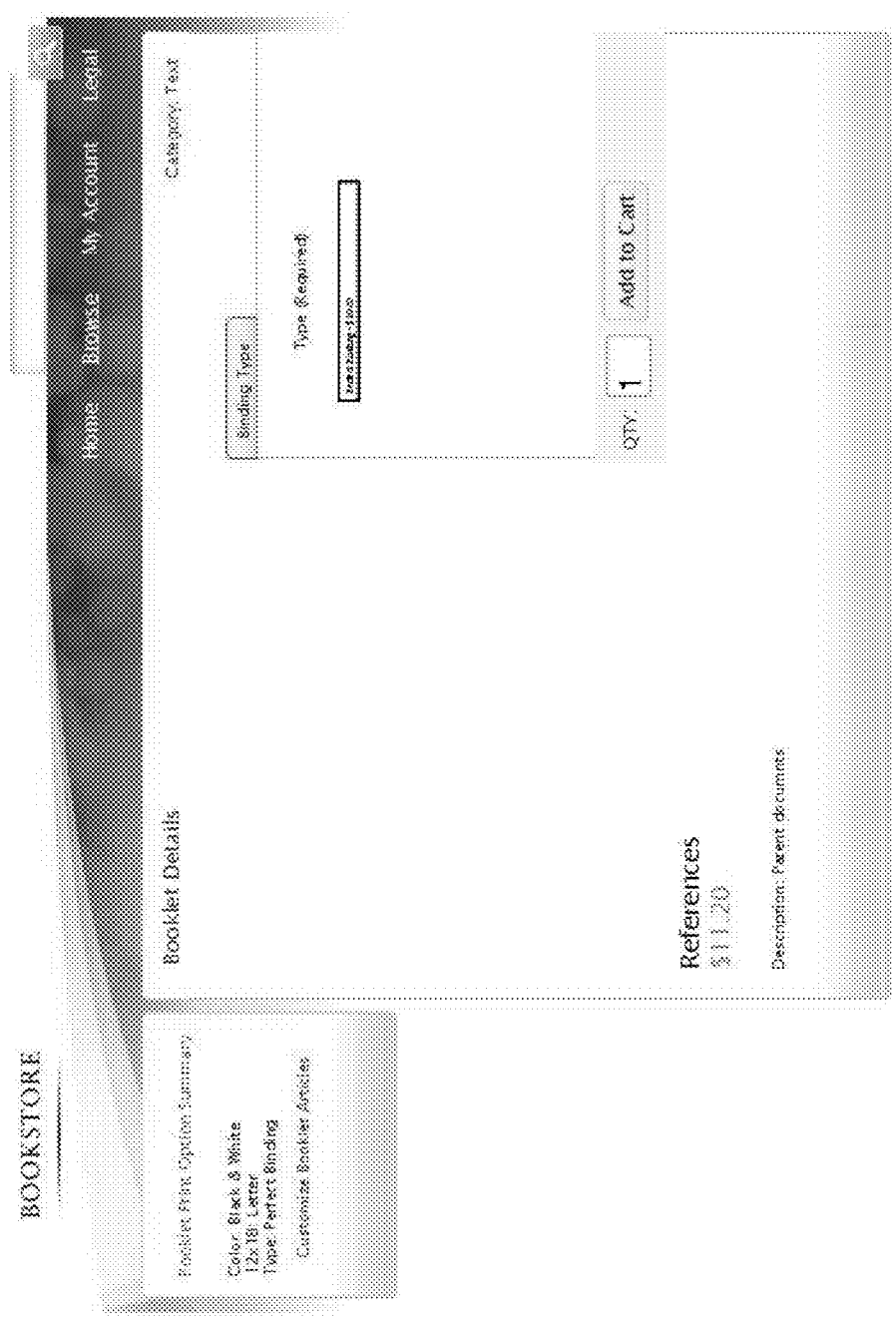

Once the reader is satisfied with the customization, he or she may indicate the quantity of the booklet to be purchased on the page shown in FIG. 21 and then click the "Add to Cart" button to proceed to the check-out step of purchasing the booklet, which is Step 250 shown in FIG. 14. A new window will open as shown in FIG. 22.

Figure 22:
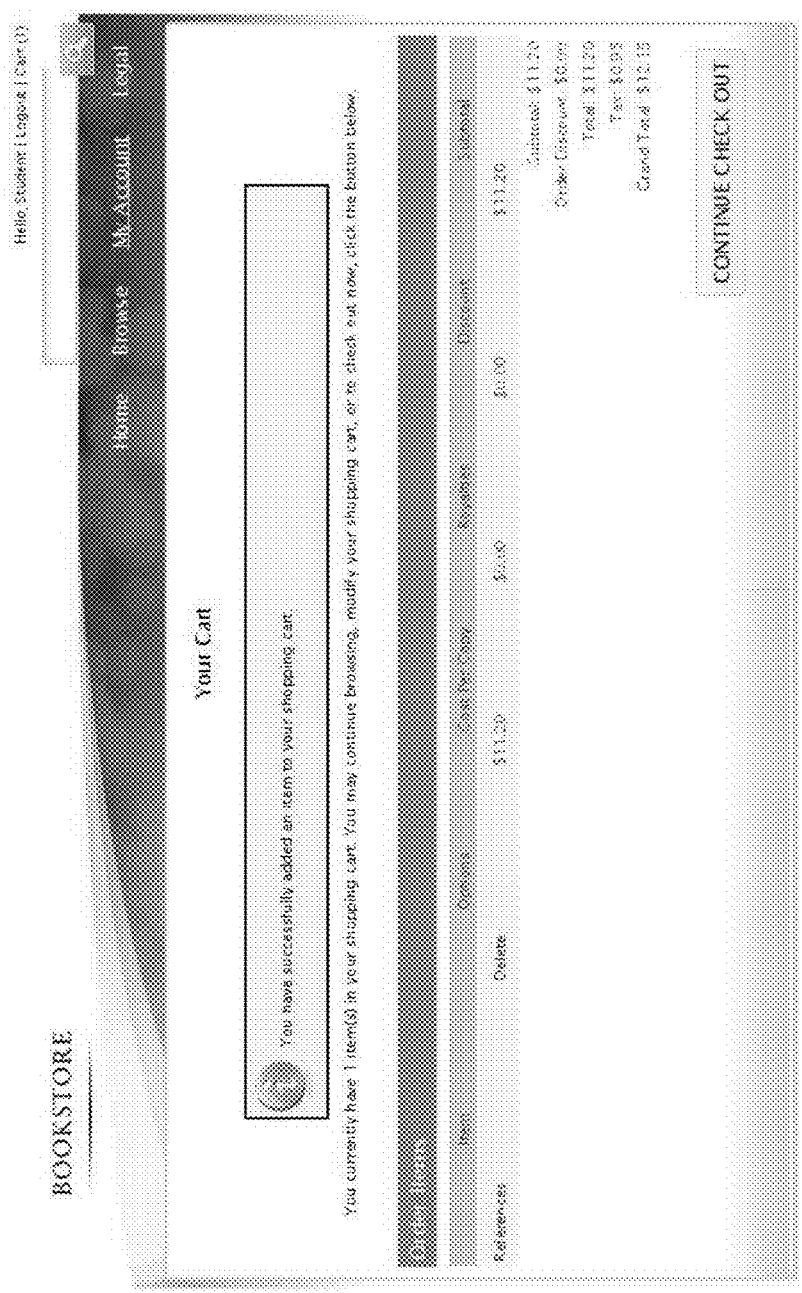

Referring to FIG. 22, there is shown a screen shot of an exemplary UI display of a shopping cart preview page of the online platform web-site. All items added to the shopping cart are displayed. Any unwanted item may be deleted from the cart.

Figure 23:
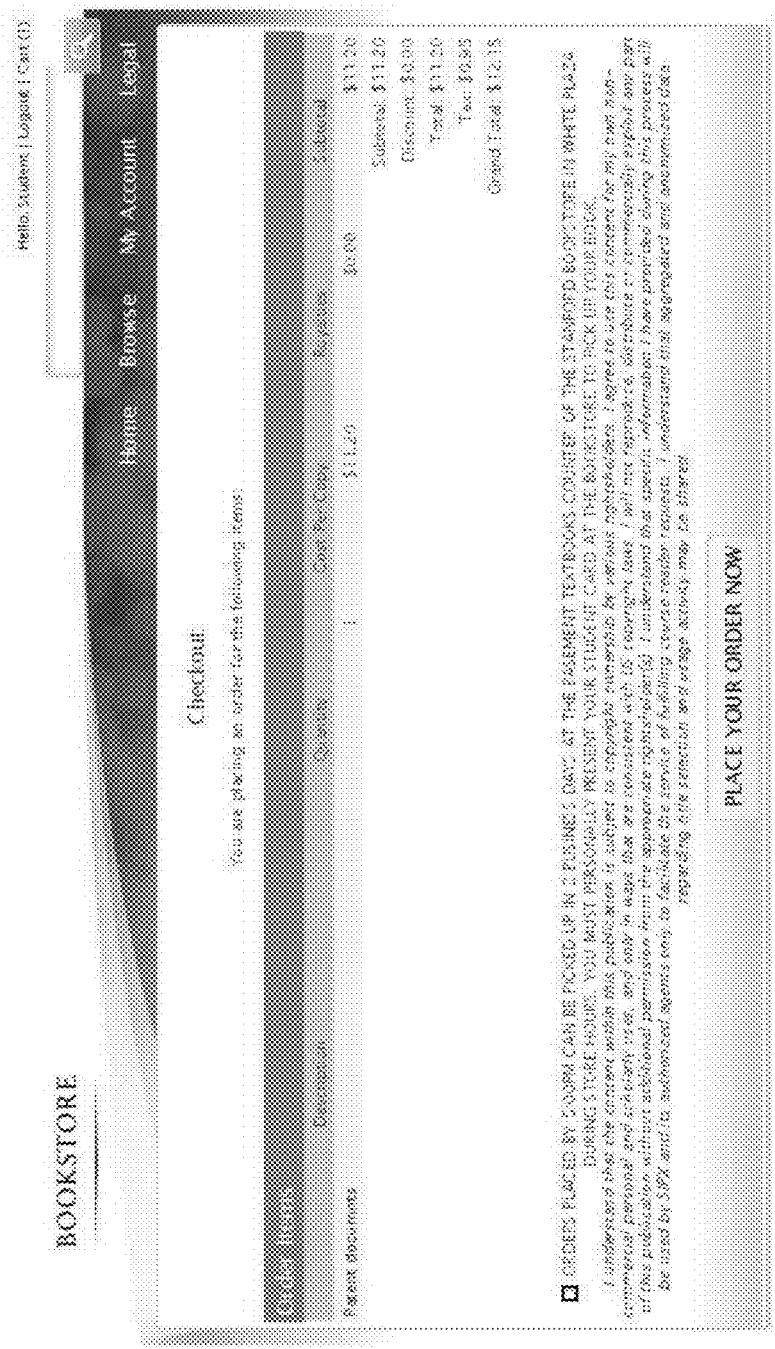

Referring to FIG. 23, there is shown a screen shot of an exemplary UI display of a checkout confirmation page of the online platform web-site. The reader is reminded with the applicable purchase policies.

Figure 24:
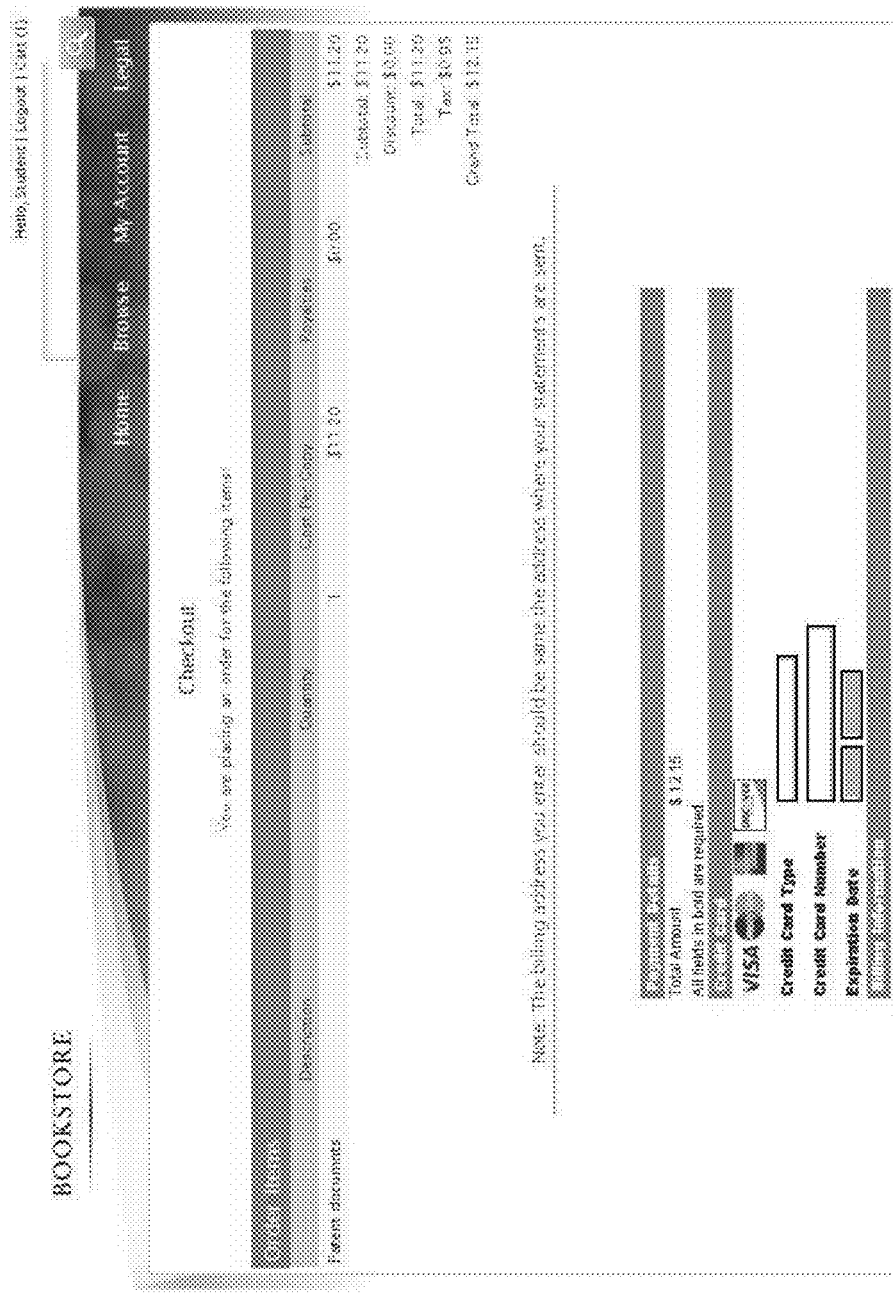

Referring to FIG. 24, there is shown a screen shot of an exemplary UI display of a payment processing page of the online platform web-site. Various available online payment methods may be utilized.

Figure 25:
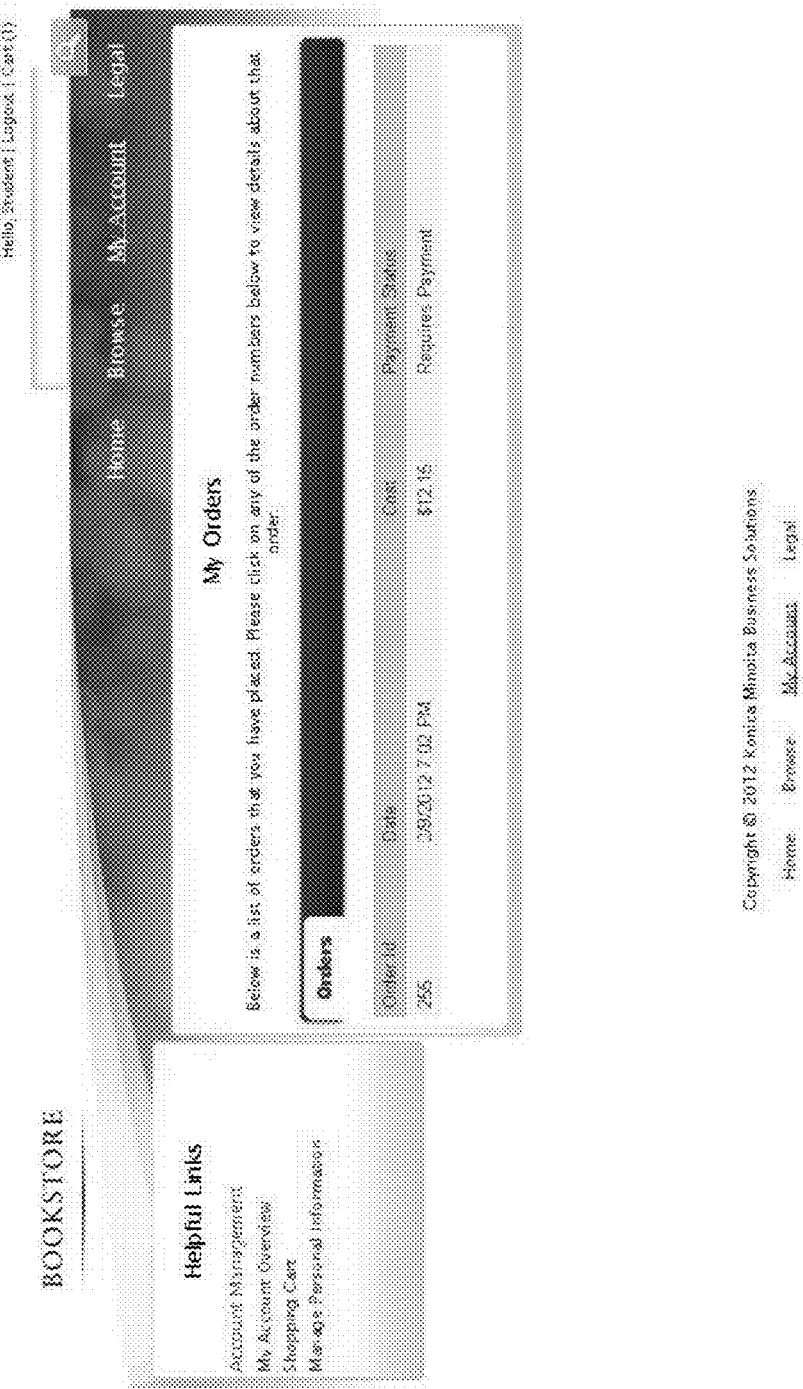

Referring to FIG. 25, there is shown a screen shot of an exemplary UI display of a reader's "Account Overview" page after the reader has placed his or her orders for purchasing one or more booklets. The status of each purchase order placed by the reader is displayed, providing a quick overview to the reader of all orders placed by the reader.

The above described process may be implemented by a computer software program. The present invention also provides a computer program product that includes a computer usable non-transitory medium (e.g. memory or storage device) having a computer readable program code embedded therein for controlling a data processing apparatus, the computer readable program code configured to cause the data processing apparatus to execute the above described process.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. In a computer system comprising a server for customizing price-related options for printing a compilation of works and at least one copyright management center server, a computer implemented method executed by the server comprising the steps of:
   (a) compiling the compilation of works;
   (b) sending information regarding the works to the at least one copyright management center server for calculating prices of the works;
   (c) setting a plurality of different printing options that describe manners of printing the compilation of works, wherein the different options correspond to different printing prices;
   (d) displaying, in a first graphical user interface (GUI), a GUI input field corresponding to each of the plurality of options which indicates whether or not the option is to be displayed to customers, including a GUI input field that indicates whether or not a first option to print the compilation of work with color or black and white is to be displayed to customers, a GUI input field that indicates whether or not a second option to print the compilation of work with different types of paper is to be displayed to customers, and a GUI input field that indicates whether or not a third option to print the compilation of work with different types of binding is to be displayed to customers;
   (e) receiving, via the GUI input fields of the first GUI displayed in step (d), one or more inputs from a user which indicate one or more of the first to third options are to be displayed to the customers and which indicate other one or more of the first to third options are not to be displayed to the customers;
   (f) displaying, in a second graphical user interface (GUI), each of the first to third options that have been indicated in step (e) as to be displayed to customers, while hiding each of the first to third options that have been indicated in step (e) as not to be displayed to customers;
   (g) receiving from a customer, via the second GUI, inputs that select an option value for each of the first to third options that are displayed in step (f); and
   (h) providing the customer with a total price for printing the compilation of works based on the options that the customer has selected in step (g) and the prices of the works.

2. A computer program product comprising a non-transitory computer usable medium having a computer readable code embodied therein for controlling a server, the server being connected to at least one copyright management center server, the computer readable program code configured to cause the server to execute a process for customizing price-related options for printing a compilation of works, the process comprising the steps of:
   (a) compiling the compilation of works;
   (b) sending information regarding the works to the at least one copyright management center server for calculating prices of the works;

(c) setting a plurality of different printing options that describe manners of printing the compilation of works, wherein the different options correspond to different printing prices;

(d) displaying, in a first graphical user interface (GUI), a GUI input field corresponding to each of the plurality of options which indicates whether or not the option is to be displayed to customers, including a GUI input field that indicates whether or not a first option to print the compilation of work with color or black and white is to be displayed to customers, a GUI input field that indicates whether or not a second option to print the compilation of work with different types of paper is to be displayed to customers, and a GUI input field that indicates whether or not a third option to print the compilation of work with different types of binding is to be displayed to customers;

(e) receiving, via the GUI input fields of the first GUI displayed in step (d), one or more inputs from a user which indicate one or more of the first to third options are to be displayed to the customers and which indicate other one or more of the first to third options are not to be displayed to the customers;

(f) displaying, in a second graphical user interface (GUI), each of the first to third options that have been indicated in step (e) as to be displayed to customers, while hiding each of the first to third options that have been indicated in step (e) as not to be displayed to customers;

(g) receiving from a customer, via the second GUI, inputs that select an option value for each of the first to third options that are displayed in step (f); and (h) providing the customer with a total price for printing the compilation of works based on the options that the customer has selected in step (g) and the prices of the works.

\* \* \* \* \*